(12) United States Patent
Petrie et al.

(10) Patent No.: US 8,239,125 B2
(45) Date of Patent: Aug. 7, 2012

(54) METHOD AND SYSTEM FOR AUTOMATICALLY DIRECTING TRAFFIC ON A SITE

(75) Inventors: Robert William Petrie, Narangba (AU); Paul Walton, Christchurch (NZ); George Derrick Darby, Jr., Dunwoody, GA (US); Juan Carlos Santamaria, Suwannee, GA (US); Augusto Opdenbosch, Alpharetta, GA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/207,090

(22) Filed: Aug. 10, 2011

(65) Prior Publication Data

US 2011/0295496 A1     Dec. 1, 2011

Related U.S. Application Data

(63) Continuation of application No. 12/135,824, filed on Jun. 9, 2008, which is a continuation-in-part of application No. 11/904,353, filed on Sep. 26, 2007.

(51) Int. Cl.
*G08G 16/16* (2006.01)
*G06F 19/00* (2006.01)
(52) U.S. Cl. .................. 701/119; 701/301; 340/905
(58) Field of Classification Search .................. 701/119, 701/300, 301; 340/902, 905; 705/4
See application file for complete search history.

(56) References Cited

U.S. PATENT DOCUMENTS

| 3,796,322 A | 3/1974 | Cording |
| 4,752,012 A | 6/1988 | Juergens |
| 4,857,753 A | 8/1989 | Mewburn-Crook et al. |
| 5,095,531 A | 3/1992 | Ito |
| 5,224,388 A | 7/1993 | Pratt |
| 5,359,542 A | 10/1994 | Pahmeier et al. |
| 5,491,486 A | 2/1996 | Welles, II |
| 5,586,030 A | 12/1996 | Kemner et al. |
| 5,634,565 A | 6/1997 | Lesage |
| 5,640,452 A | 6/1997 | Murphy |
| 5,646,844 A | 7/1997 | Gudat et al. |
| 5,650,770 A | 7/1997 | Schlager et al. |
| 5,752,197 A | 5/1998 | Rautiola |
| 5,859,839 A | 1/1999 | Ahlenius et al. |
| 5,883,817 A | 3/1999 | Chisholm et al. |

(Continued)

FOREIGN PATENT DOCUMENTS

GB      2373086      9/2002

(Continued)

OTHER PUBLICATIONS

"Tower Cranes Anti-Collision and Zone Protection System", www.tac3000.com, (2004),36.

(Continued)

*Primary Examiner* — Tan Q Nguyen

(57) ABSTRACT

In a method for automatically directing traffic on a site, information is received regarding a plurality of selected entities on the job site. An indication of a first priority assigned to a first of the plurality of selected entities is received. An indication of a second priority assigned to a second of the plurality of selected entities is received. It is then determined that the first of the plurality of selected entities has a right of way over the second of the plurality of selected entities based upon a comparison of the first priority and the second priority.

18 Claims, 10 Drawing Sheets

U.S. PATENT DOCUMENTS

| | | |
|---|---|---|
| 5,890,091 A | 3/1999 | Talbot et al. |
| 5,917,405 A | 6/1999 | Joao |
| 5,931,875 A | 8/1999 | Kemner et al. |
| 5,987,379 A | 11/1999 | Smith |
| 6,016,117 A | 1/2000 | Nelson, Jr. |
| 6,046,687 A | 4/2000 | Janky |
| 6,064,335 A | 5/2000 | Eschenbach |
| 6,067,031 A | 5/2000 | Janky et al. |
| 6,118,196 A | 9/2000 | Cheng-Yon |
| 6,124,825 A | 9/2000 | Eschenbach |
| 6,144,307 A | 11/2000 | Elliot |
| 6,166,688 A | 12/2000 | Cromer et al. |
| 6,216,071 B1 | 4/2001 | Motz |
| 6,243,648 B1 | 6/2001 | Kilfeather et al. |
| 6,246,932 B1 * | 6/2001 | Kageyama et al. ............ 701/24 |
| 6,268,804 B1 | 7/2001 | Janky et al. |
| 6,297,744 B1 | 10/2001 | Baillargeon et al. |
| 6,301,616 B1 | 10/2001 | Pal et al. |
| 6,317,500 B1 | 11/2001 | Murphy |
| 6,320,273 B1 | 11/2001 | Nemec |
| 6,330,149 B1 | 12/2001 | Burrell |
| 6,356,196 B1 | 3/2002 | Wong et al. |
| 6,362,736 B1 | 3/2002 | Gehlot |
| 6,377,165 B1 | 4/2002 | Yoshioka et al. |
| 6,439,515 B1 | 8/2002 | Powers |
| 6,453,237 B1 | 9/2002 | Fuchs et al. |
| 6,459,988 B1 | 10/2002 | Fan et al. |
| 6,480,788 B2 | 11/2002 | Kilfeather et al. |
| 6,484,078 B1 | 11/2002 | Kageyama |
| 6,501,421 B1 | 12/2002 | Dutta |
| 6,505,049 B1 | 1/2003 | Dorenbosch |
| 6,512,465 B2 | 1/2003 | Flick |
| 6,539,307 B1 | 3/2003 | Holden et al. |
| 6,560,536 B1 | 5/2003 | Sullivan et al. |
| 6,609,064 B1 | 8/2003 | Dean |
| 6,650,242 B2 | 11/2003 | Clerk et al. |
| 6,651,000 B2 | 11/2003 | Diggelen et al. |
| 6,657,587 B1 | 12/2003 | Mohan |
| 6,658,336 B2 | 12/2003 | Browne et al. |
| 6,658,349 B2 | 12/2003 | Cline |
| 6,668,157 B1 | 12/2003 | Takeda et al. |
| 6,675,095 B1 | 1/2004 | Bird et al. |
| 6,677,938 B1 | 1/2004 | Maynard |
| 6,700,762 B2 | 3/2004 | Underwood et al. |
| 6,725,158 B1 | 4/2004 | Sullivan et al. |
| 6,801,853 B2 | 10/2004 | Workman |
| 6,804,602 B2 | 10/2004 | Impson et al. |
| 6,826,452 B1 | 11/2004 | Holland et al. |
| 6,829,535 B2 | 12/2004 | Diggelen et al. |
| 6,843,383 B2 | 1/2005 | Schneider et al. |
| 6,864,789 B2 | 3/2005 | Wolfe |
| 6,865,169 B1 | 3/2005 | Quayle et al. |
| 6,934,629 B1 | 8/2005 | Chisholm et al. |
| 6,970,801 B2 | 11/2005 | Mann |
| 6,981,423 B1 | 1/2006 | Discenzo |
| 7,020,555 B1 | 3/2006 | Janky et al. |
| 7,031,883 B1 | 4/2006 | Lee |
| 7,032,763 B1 | 4/2006 | Zakula, Sr. et al. |
| 7,034,683 B2 | 4/2006 | Ghazarian |
| 7,050,907 B1 | 5/2006 | Janky et al. |
| 7,070,060 B1 | 7/2006 | Feider et al. |
| 7,095,368 B1 | 8/2006 | Diggelen |
| 7,095,370 B1 | 8/2006 | Diggelen et al. |
| 7,158,883 B2 | 1/2007 | Fuchs et al. |
| 7,212,120 B2 | 5/2007 | Gudat |
| 7,289,875 B2 | 10/2007 | Recktenwald et al. |
| 7,295,855 B1 | 11/2007 | Larsson et al. |
| 7,298,319 B2 | 11/2007 | Han et al. |
| 7,308,114 B2 | 12/2007 | Takehara et al. |
| 7,313,476 B2 | 12/2007 | Nichols et al. |
| 7,324,921 B2 | 1/2008 | Sugahara et al. |
| 7,344,037 B1 | 3/2008 | Zakula et al. |
| 7,367,464 B1 | 5/2008 | Agostini et al. |
| 7,395,151 B2 * | 7/2008 | O'Neill et al. ............ 701/209 |
| 7,548,200 B2 | 6/2009 | Garin |
| 7,548,816 B2 | 6/2009 | Riben et al. |
| 7,639,181 B2 | 12/2009 | Wang et al. |
| 7,667,642 B1 | 2/2010 | Frericks et al. |
| 7,710,317 B2 | 5/2010 | Cheng et al. |
| 7,719,416 B2 | 5/2010 | Arms et al. |
| 7,756,615 B2 | 7/2010 | Barfoot et al. |
| 2002/0070856 A1 | 6/2002 | Wolfe |
| 2002/0082036 A1 | 6/2002 | Ida et al. |
| 2002/0117609 A1 | 8/2002 | Thibault et al. |
| 2002/0142788 A1 | 10/2002 | Chawla et al. |
| 2002/0196151 A1 | 12/2002 | Troxler |
| 2003/0045314 A1 | 3/2003 | Burgan et al. |
| 2003/0064744 A1 | 4/2003 | Zhang et al. |
| 2003/0073435 A1 | 4/2003 | Thompson et al. |
| 2003/0119445 A1 | 6/2003 | Bromham et al. |
| 2004/0024522 A1 | 2/2004 | Walker et al. |
| 2004/0034470 A1 | 2/2004 | Workman |
| 2004/0044911 A1 | 3/2004 | Takada et al. |
| 2004/0145496 A1 * | 7/2004 | Ellis ............................ 340/905 |
| 2004/0196182 A1 | 10/2004 | Unnold |
| 2004/0219927 A1 | 11/2004 | Sumner |
| 2004/0243285 A1 | 12/2004 | Gounder |
| 2005/0030175 A1 | 2/2005 | Wolfe |
| 2005/0055161 A1 | 3/2005 | Kalis et al. |
| 2005/0095985 A1 | 5/2005 | Hafeoz |
| 2005/0103738 A1 | 5/2005 | Recktenwald et al. |
| 2005/0116105 A1 | 6/2005 | Munk et al. |
| 2005/0137742 A1 | 6/2005 | Goodman et al. |
| 2005/0147062 A1 | 7/2005 | Khouaja et al. |
| 2005/0154904 A1 | 7/2005 | Perepa et al. |
| 2005/0179541 A1 | 8/2005 | Wolfe |
| 2005/0242052 A1 | 11/2005 | O'Connor et al. |
| 2006/0027677 A1 | 2/2006 | Abts |
| 2006/0243056 A1 | 11/2006 | Sundermeyer et al. |
| 2007/0005244 A1 | 1/2007 | Nadkarni |
| 2007/0027583 A1 * | 2/2007 | Tamir et al. ...................... 701/1 |
| 2007/0159354 A1 * | 7/2007 | Rosenberg ................... 340/902 |
| 2007/0255498 A1 | 11/2007 | McDaniel et al. |
| 2008/0014965 A1 | 1/2008 | Dennison et al. |
| 2008/0036617 A1 | 2/2008 | Arms et al. |
| 2008/0100977 A1 | 5/2008 | Shreiner et al. |
| 2008/0122234 A1 | 5/2008 | Alioto et al. |
| 2009/0009389 A1 | 1/2009 | Mattos |
| 2009/0109049 A1 | 4/2009 | Frederick et al. |
| 2010/0100338 A1 | 4/2010 | Vik et al. |
| 2010/0332266 A1 * | 12/2010 | Tamir et al. ...................... 705/4 |

FOREIGN PATENT DOCUMENTS

| | | |
|---|---|---|
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |
| JP | 2002/217811 | 8/2002 |
| WO | WO-00/68907 | 11/2000 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Anti-Collision Systems A Clash of Cultures", http://www.cranestodaymagazine.com/story.asp?sectionCode=66&storyCode=2043070, (Mar. 21, 2007),6.

Abderrahim, M. et al., "A Mechatronics Security System for the Construction Site", www.elsevier.com/locate/autcon, (Sep. 7, 2004),460-466.

"Highland Man's Invention Success With Dewalt", http://www.heraldextra.com/content/view/195674/4/, (Oct. 8, 2006),3.

* cited by examiner

700

```
RECEIVING INFORMATION REGARDING A PLURALITY OF
SELECTED ENTITIES ON A JOB SITE, THE INFORMATION
RECEIVED AT A LOCATION INDEPENDENT FROM THE ENTITIES
710
```

↓

```
EVALUATING THE INFORMATION TO DETERMINE WHETHER A
TRIGGER HAS OCCURRED, THE TRIGGER ASSOCIATED WITH A
POTENTIAL COLLISION SITUATION INVOLVING AN ENTITY OF
THE ENTITIES
720
```

↓

```
ISSUING A COLLISION ALERT MESSAGE TO THE ENTITY IF THE
TRIGGER HAS OCCURRED
730
```

FIG. 7

METHOD AND SYSTEM FOR AUTOMATICALLY DIRECTING TRAFFIC ON A SITE

RELATED APPLICATIONS

This application claims priority to and is a Continuation of the co-pending patent application Ser. No. 12/135,824, entitled "METHOD AND SYSTEM FOR AUTOMATICALLY DIRECTING TRAFFIC ON A SITE," by Rob Petrie, Paul Walton, Derrick Darby, Juan Carlos Santamaria, and Augusto Opdenbosch, with filing date Jun. 9, 2008, assigned to the assignee of the present invention, and which is incorporated by reference in its entirety herein.

Application Ser. No. 12/135,824 was filed as a Continuation-in-Part Application of U.S. patent application Ser. No. 11/904,353, titled "COLLISION AVOIDANCE," by Derrick Darby, Juan Carlos Santamaria, Augusto Opdenbosch, filed Sep. 26, 2007, assigned to the assignee of the present invention, and which is incorporated by reference in its entirety herein.

BACKGROUND

Presently, on a job site, such as a construction site, workers and management utilize physical barriers and/or mark regions and entities of the job site which should be avoided or not entered. For example, to protect an endangered ancient tree a worker may mark a protected region by placing flags around the tree or else by placing stakes around the tree and stringing ropes or plastic tape between the stakes. These markings are intended to prevent a worker from entering the region. Obviously, some flags, stakes, rope, and/or plastic are not sufficient to stop a dozer or an earthmover from entering such a protected region and potentially damaging the tree. Additionally, if a worker is unaware of or cannot see the markings, this mechanism of collision avoidance is not effective. Thus, the effectiveness of protecting regions or entities in this manner is very dependent upon workers maintaining situational awareness, especially when operating vehicles or construction equipment assets.

Likewise, avoidance of a collision between one physical job site entity, such as a vehicle, and another physical job site entity, such as a second vehicle is also heavily dependent upon situational awareness of one or more workers. Presently, some collision avoidance measures such as proximity alarms do exist. Such proximity alarms typically transmit a signal which can be sensed by similar alarms. Then, when one proximity alarm is in reception range of a second proximity alarm, some sort of a warning is enunciated or emitted. Such proximity alarms are helpful, but their use and applications are limited. This is due in part to the inherent imprecision associated with proximity sensing (e.g., transmission and reception ranges may vary greatly from one proximity alarm to another). This is also due in part to the fact that such alarms are not operable to react in a flexible manner based upon a variety of situational factors, such as speed of an entity, location on a job site, type of entity or entities involved, conditions at the job site, and/or three-dimensional location of an entity relative to another entity. Furthermore, a proximity alarm may not convey enough information to a vehicle operator to permit the operator to avoid a collision.

As can be seen, presently existing forms of job site collision avoidance have drawbacks which limit their flexibility and effectiveness.

SUMMARY

In a method for automatically directing traffic on a site, information is received regarding a plurality of selected entities on the job site. An indication of a first priority assigned to a first of the plurality of selected entities is received. An indication of a second priority assigned to a second of the plurality of selected entities is received. It is then determined that the first of the plurality of selected entities has a right of way over the second of the plurality of selected entities based upon a comparison of the first priority and the second priority.

BRIEF DESCRIPTION OF THE DRAWINGS

The accompanying drawings, which are incorporated in and form a part of this application, illustrate embodiments of the present technology for collision avoidance, and together with the description, serve to explain the principles of the present technology. Unless noted, the drawings referred to in this description should be understood as not being drawn to scale.

FIG. 7 is a flow diagram of an example method for avoiding a collision on a job site, in accordance with one embodiment.

DETAILED DESCRIPTION

Figure 1:
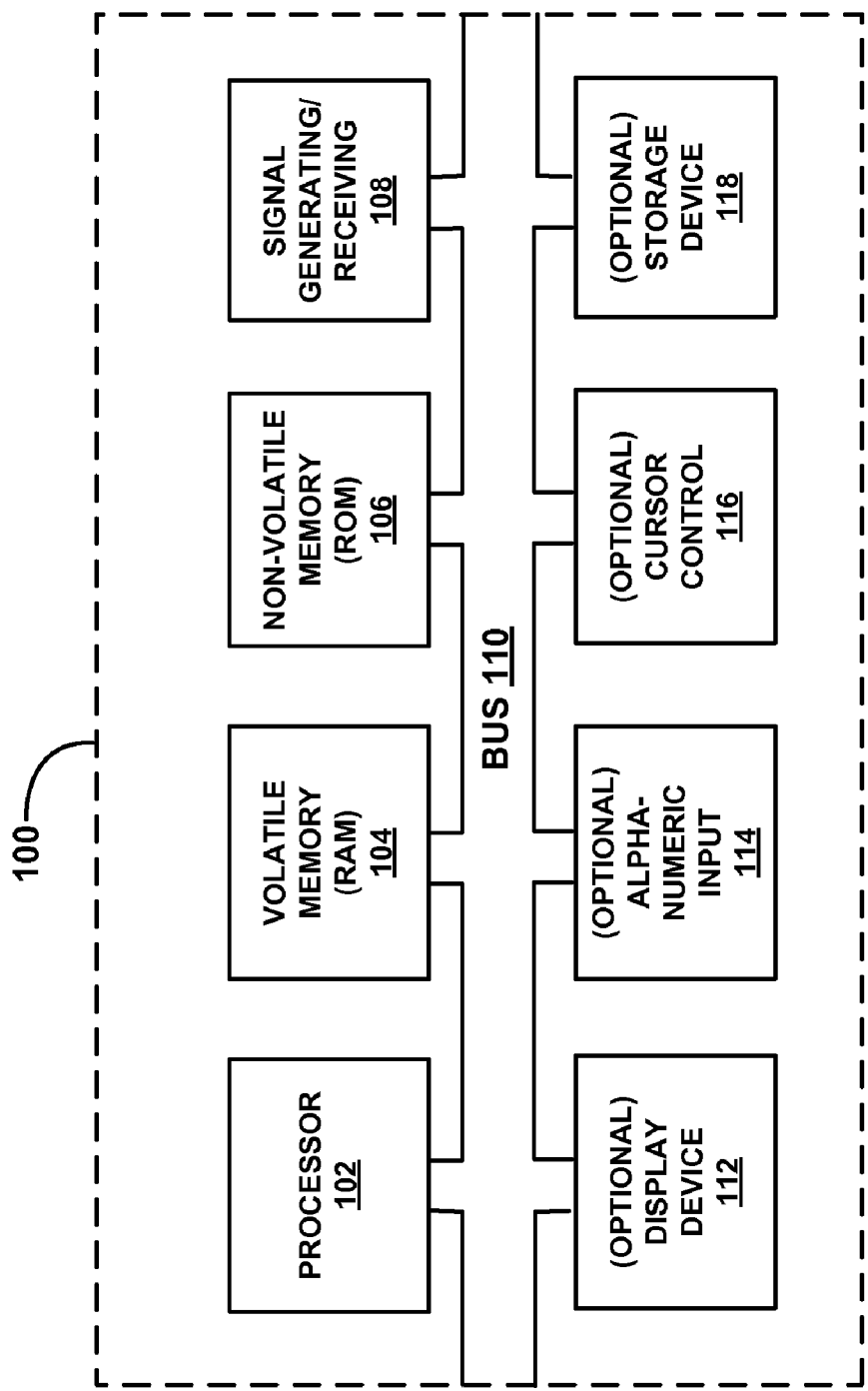
FIG. 1 is a block diagram of an example computer system used in accordance with an embodiment.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope as defined by the appended claims. Furthermore, in the following description, numerous specific details are set forth in order to provide a thorough understanding of the present technology. In other instances, well-known methods, procedures, objects, and circuits have not been described in detail as not to unnecessarily obscure aspects of the present technology.

NOTATION AND NOMENCLATURE

Unless specifically stated otherwise as apparent from the following discussions, it is appreciated that throughout the present detailed description, discussions utilizing terms such as "receiving", "evaluating", "issuing", "setting", "continuing", "comparing", "transmitting", "providing", "facilitating", "outputting", "allowing", "implementing", "establishing", or the like, refer to the actions and processes of a computer system (such as computer system 100 of FIG. 1), or similar electronic computing device. Computer system 100 or similar electronic computing device manipulates and transforms data represented as physical (electronic) quantities within the computer system's registers and memories into other data similarly represented as physical quantities within the computer system memories or registers or other such information storage, transmission, or display devices.

The present technology may be described in the general context of computer-executable instructions, such as program modules, being executed or executable by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices. The present technology may also be implemented in a peer-to-peer computing environment where tasks are performed by processing devices in each vehicle at a site and which are linked through a communications network.

Overview of Discussion

Discussion will begin with a description of an example computer system environment with which, or upon which, embodiments of the present technology may operate. Discussion will proceed to a description of an example of a collision avoidance system. A general description of the operation of the components of this collision avoidance system will be provided. A collision avoidance device, which can be used in conjunction with the collision avoidance system, will then be described. Operation of collision avoidance system and the collision avoidance device will then be described in more detail in conjunction with a description of an example method for avoiding a collision on a job site.

As described herein, entities may be physical entities or virtual entities which are located on or proximate to a job site. Some examples of physical entities are buildings, structures, building materials, cranes, crane booms, vehicles, construction equipment assets, and people. For purposes of this specification a construction equipment asset is defined as a piece of construction machinery, which is typically mobile. Some examples of construction equipment assets include, but are not limited to: a dozer, a loader, a heavy truck (e.g., a dump truck), a grader, a scraper, a tractor, a backhoe, and the like.

An example of a virtual entity is a virtually marked geo-fence which is associated with two-dimensional or three-dimensional locations on or proximate to a job site. For example, such a geo-fence may exist as a virtual barrier marked around a protected physical object or region, such as an ancient tree, a saguaro cactus, or an endangered butterfly habitat. Likewise such a geo-fence may exist as a virtual barrier marked around a dangerous region such as a high voltage line or a job site location with unstable or contaminated soil. Such a geo-fence may also be used in combination with a physical barrier (e.g., ropes and flags). Another example of a virtual entity is a zone or volume which is associated with a physical entity, such a crane boom. Such an associated virtual entity will typically move in conjunction with movement of the physical entity with which it is associated. Another example of a virtual entity is a path or designated roadway within a work site. The roadway may also be physically designated and marked at the work site.

As described herein, a job site is typically a location such as a construction site, warehouse, freight terminal, open pit mine, waste disposal area, factory, utility plant, and/or another distinct location where workers operate entities such as construction equipment assets, vehicles, mining equipment, and/or cranes.

Example Computer System Environment

With reference now to FIG. 1, a block diagram is shown of an embodiment of an example computer system 100 which may be used in accordance with various embodiments described herein. It should be appreciated that computing system 100 is not strictly limited to being a computer system. As such, computer system 100 of the present embodiment may be well suited to be any type of computing device (e.g., real time server computer, web server, portable computing device, desktop computer, mobile phone, pager, personal digital assistant, collision avoidance device, collision avoidance system, etc.). Within the discussions herein, certain processes and steps are discussed that are realized, in one embodiment, as a series of instructions (e.g., software program) that reside within computer readable memory units and are executed by a processor(s) of computing system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computing system 100 of FIG. 1 may also include one or more optional computer usable data storage devices 118 such as a magnetic or optical disk and disk drive (e.g., hard drive, floppy diskette, Compact Disk-Read Only Memory (CD- ROM), Digital Versatile Disk (DVD)) coupled with bus 110 for storing information and/or computer executable instructions. An optional display device 112 may be coupled to bus 110 of computing system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Example Collision Avoidance System

Figure 2:
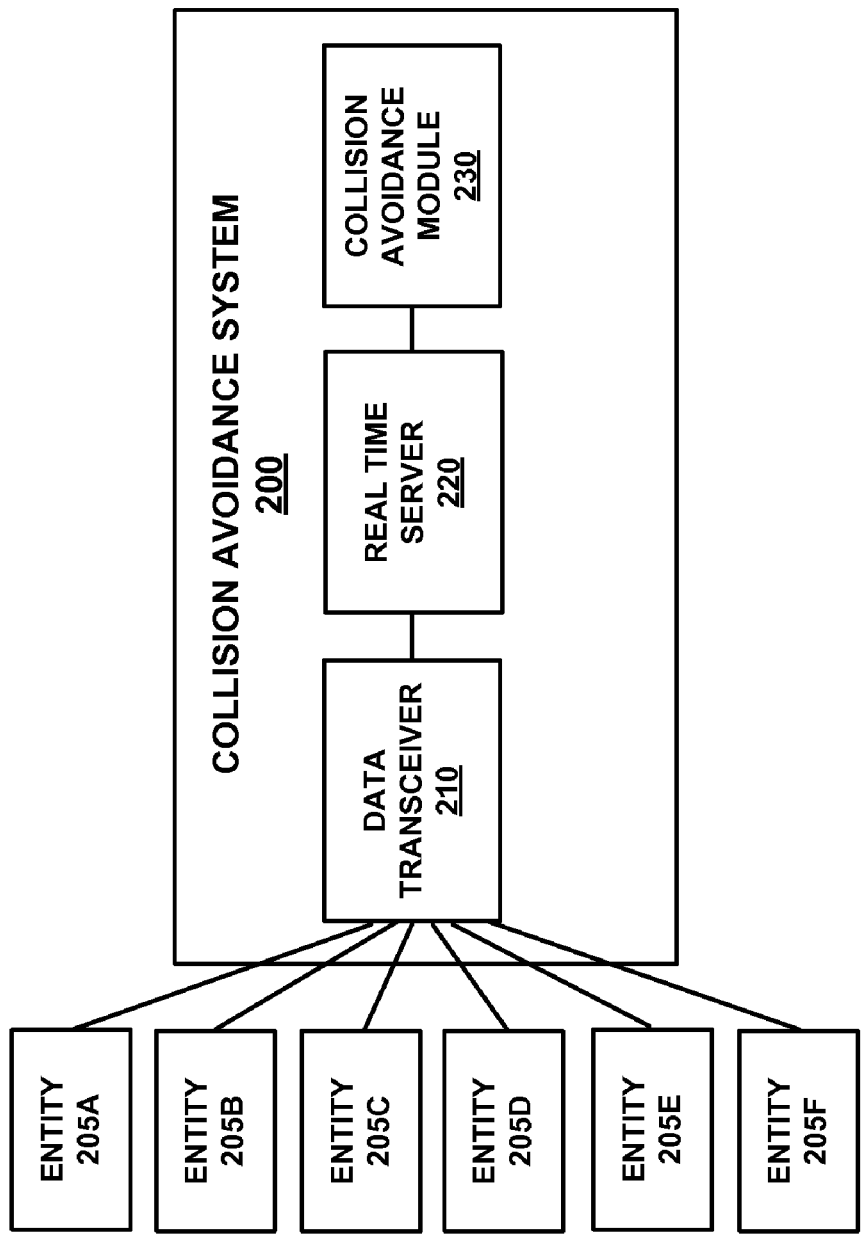
FIG. 2 is a block diagram of an example collision avoidance system, in accordance with one embodiment.

Referring now to FIG. 2, a block diagram is shown of an example collision avoidance system 200. As will be further described herein, system 200 may be utilized to help avoid collisions between entities on a job site.

As shown in FIG. 2, collision avoidance system 200 is comprised of a data transceiver 210, a real time server 220, and a collision avoidance module 230. It is appreciated that while the components of system 200 are coupled together they are not required to be physically close to one another. For example, in one embodiment, data transceiver 210 is located on or proximate to a job site, while real time server 220 and collision avoidance module 230 are located in a different town, state or country from data transceiver 210. In one such example, data transceiver 210 is coupled with real time server via transmission control protocol/internet protocol, while real time server 220 and collision avoidance module 230 are coupled together as part of a local area network. Alternatively, collision avoidance system 200, or components thereof, may be implemented upon each construction equipment asset of a work site.

Data transceiver 210 is configured for wirelessly receiving information regarding a plurality of entities on a job site. Data transceiver 210 operates wirelessly to receive information in one or more well known fashions, such as via Bluetooth, via WiMax, via cellular telephone or radio, via one of the Institute of Electrical and Electronics Engineers 802.1 family of standards, or via other wireless data communication standard or protocol. Likewise, data transceiver 210 is also operable to wirelessly transmit information, such as a collision alert message received from collision avoidance module 230 via real time server 220. Such a transmitted collision alert message can be transmitted to a single entity (e.g., entity 205A) or to a plurality of entities (e.g., entities 205A, 205B, and 205C). In one embodiment, data transceiver 210 is located on or proximate to a particular job site. In another embodiment, data transceiver 210 is located independent from a job site and employs a wireless communication technology (e.g., cellular telephone or radio) to carryout communications with entities on, proximate to, or assigned to a particular job site. In some embodiments, information transceiver 210 converts information received from data transceiver 210 into triplet information format. Such conversion is further described below.

With continued reference to FIG. 2, real time server 220 is shown coupled with data transceiver 210. Real time server 220 is configured for providing the received information in real time to a subscribed module, such as collision avoidance module 230, and in some embodiments to a plurality of subscribed modules. Real time server 220 serves out received information in a real time fashion (nearly immediately) to subscribed modules after the data is received. This allows subscribed modules to make "decisions" and/or take actions based upon the served information in real time (nearly contemporaneously with the occurrence and reporting of the information). This also allows a subscribed module to issue instructions and/or messages based upon the information in real time (nearly contemporaneously with the occurrence and reporting of the information). In some embodiments, where a conversion has not yet been accomplished, real time server 220 converts information received from data transceiver 210 into triplet information format. In one embodiment, real time server 220 is also operable to transfer information, such as a collision alert message from collision avoidance module 230 to data transceiver 210.

Collision avoidance module 230 is coupled with real time server 220 and configured to receive selected portions of the information which has been reported to real time server 220 via data transceiver 210. In some embodiments, this means that collision avoidance module 230 is subscribed to receive selected information (such as location and or operation information) from one or more selected entities. Collision avoidance module 230 is configured for evaluating selected portions of the information for occurrence of a trigger associated with a potential collision situation involving an entity (e.g., 205A) of the plurality of entities (e.g., 205A, 205B, 205C, 205D, 205E, 205F) which data transceiver 210 receives information regarding.

In one embodiment, collision avoidance module 230 is located independently from the plurality of entities (e.g., 205A, 205B, 205C, 205D, 205E, 205F) which it receives information regarding. This means that in one embodiment collision avoidance module 230 is not part of or physically connected/attached to an entity which it tracks collisions for or to a collision avoidance device 600 that is coupled with such an entity (e.g., entity 205A). In one instance, collision avoidance module 230 may be located at the same job site as one or more of the entities about which it receives information. However, as previously described, in other instances, collision avoidance module 230 functions equally well when located a great distance away from the entities about which it receives information. Thus collision avoidance module 230 may be located in a different town, state, or country than one or more entity (e.g., 205A) which it receives information regarding and/or from the one or more collision avoidance devices 600 from which it receives information.

Figure 3:
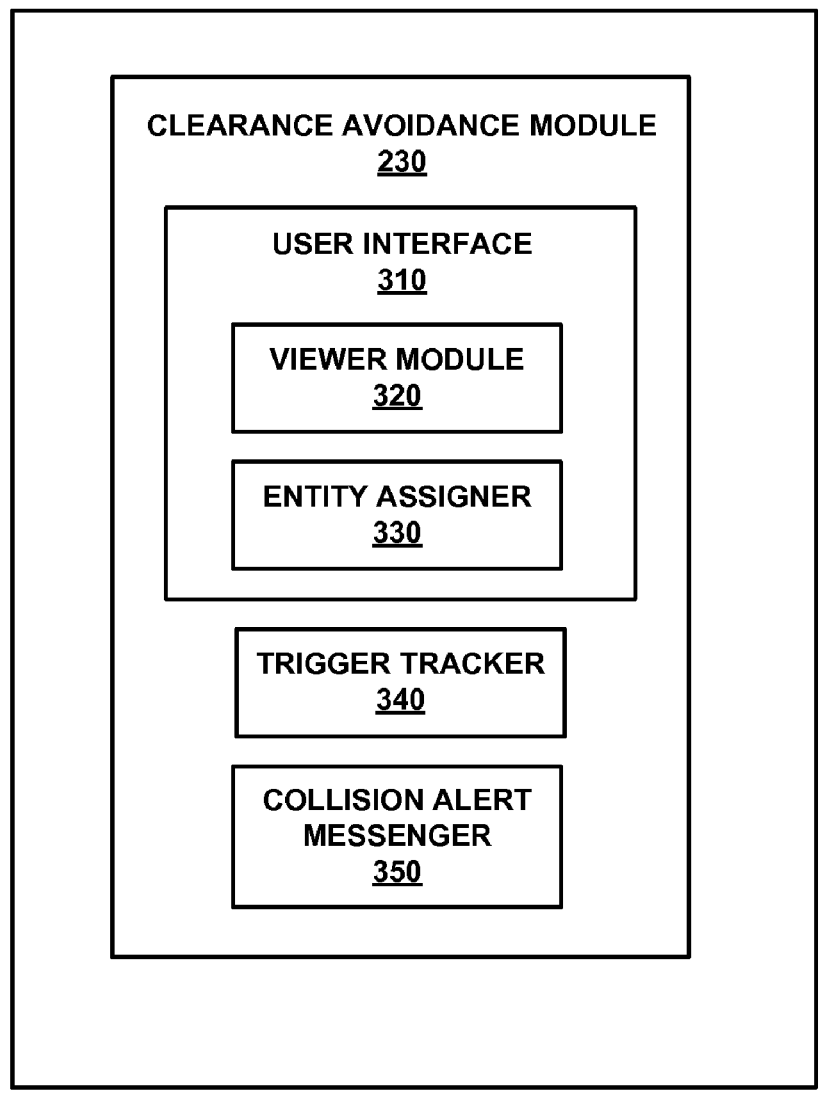
FIG. 3 is a block diagram of an example collision avoidance module utilized in a collision avoidance system, in accordance with one embodiment.

With reference now to FIG. 3, a block diagram is shown of an example collision avoidance module 230, which may be utilized in collision avoidance system 200, in accordance with one embodiment. As shown in FIG. 3, in one embodiment, collision avoidance module 230 comprises a plurality of sub-modules including a user interface 310, a trigger tracker 340, and a collision alert messenger 350. As shown in FIG. 3, in one embodiment, user interface 310 further comprises sub-modules including a viewer module 320, and an entity assigner 330. It is appreciated that any of the modules and/or sub-modules of collision avoidance module 230 are capable of interacting with any or all of the other modules and/or sub-modules of collision avoidance module 230.

With continued reference to FIG. 3, user interface 310 is configured for facilitating user interaction with and modification of settings of collision avoidance module 230.

For example, in one embodiment, through functionality offered by viewer module 320, a user is able to view a real time visualization (e.g., a model/simulation) of a work site and the entities thereon or proximate thereto which are being tracked for purposes of collision avoidance.

More specifically, viewer module 320 is configured for outputting in real time a viewable rendering of the one or more entities for which collision avoidance module 230 receives information. In one embodiment, viewer module 320 outputs a viewable rendering which is formatted as either a two-dimensional or three-dimensional rendering of these entities with respect to the job site that the entity/entities are on or proximate to. Such a viewable rendering may also comprise other physical and/or virtual entities that are mapped, modeled, or located on or proximate to the job site. In one embodiment, viewer module 320 outputs the viewable rendering for viewing on a display device, such as, for example, display device 112.

Figure 4:
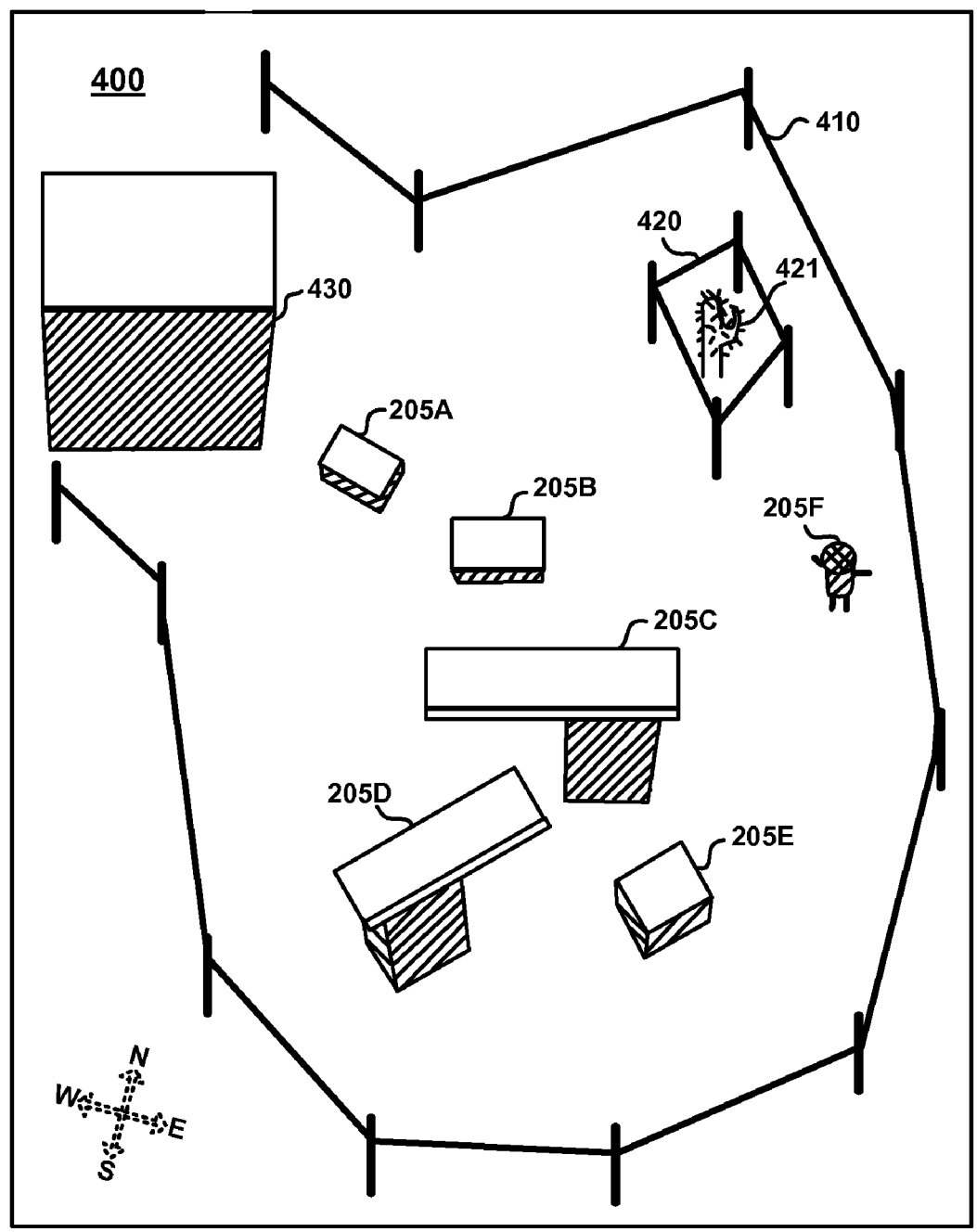
FIG. 4 is an example of a displayed visual rendering of entities on a job site, in accordance with one embodiment.

FIG. 4 shows an example of a displayed visual rendering 400 of entities on a job site, in accordance with one embodiment. For purposes of illustration of this concept, entities in FIG. 4 are shown at a low level of detail. It is appreciated that in other embodiments, the entities of FIG. 4 may be shown at other levels of detail. In FIG. 4, displayed entity 205A represents the position of a vehicle within a job site bounded by geo-fence 410. Displayed entity 420 represents a geo-fence that has been established surrounding protected saguaro cactus 421 (which may not be displayed in some visual representations). Displayed entity 430 represents a structure that is present on the job site. Displayed entity 205B represents a construction foreman's truck. Displayed entity 205C represents a crane boom of a tower crane. Displayed entity 205D represents a crane boom of a second tower crane. Displayed entity 205E represents an earthmover (a construction equipment asset). Finally, displayed entity 205F represents a person, in this case a worker at the job site. In FIG. 4, each displayed entity is displayed either at its modeled location, or at the location represented by the most recent location information received regarding the entity.

In one embodiment, viewer module 320 utilizes identification information associated with an entity to retrieve a model of the entity from a database of stock entity models. Thus for entity 205A, a vehicle, an appropriately sized model is retrieved. In one embodiment, viewer module 320 alters the appearance of the representation of an entity in a viewable rendering in response to occurrence of a trigger associated with the entity. For example, viewer module 320 causes the viewable representation of the entity to change in color or flash in response to occurrence of a trigger associated with the entity. It is appreciated that in some embodiments, viewer module 320 may comprise a modeling and simulation module which is separate from collision avoidance module 230.

Entity assigner 330 is configured for allowing assignment of an entity to a job site and modification of characteristics associated with the entity. Thus, in one embodiment, through functionality offered by entity assigner 330, a user is able to select which entity or entities are tracked for collision avoidance. Through entity assigner 330 a user may associate and/or disassociate a particular entity with the geographic location of a particular job site and physical and/or virtual entities of the particular job site. Entity assigner 330 additionally enables a user to subscribe to or unsubscribe from selected real time information served by real time server 220 regarding an entity.

Entity assigner 330 also allows a user to set and/or modify one or more conditions of a trigger associated with a tracked entity. This gives a user the flexibility to change, add, or remove a trigger based upon changing conditions, activities, or situations which may occur at a job site. For instance, a user may add or expand a virtual geo-fence or virtual exclusion zone around a protected wetland region in response rain being forecast to occur at a job site. Additionally, it is appreciated that entity assigner 330 allows a user to make such changes to a trigger from a central location without contacting or interacting with the entity on a collision avoidance device coupled with an entity. Entity assigner 330 also allows a user to assign, remove, or modify a virtual entity with respect to a job site.

Figure 5:
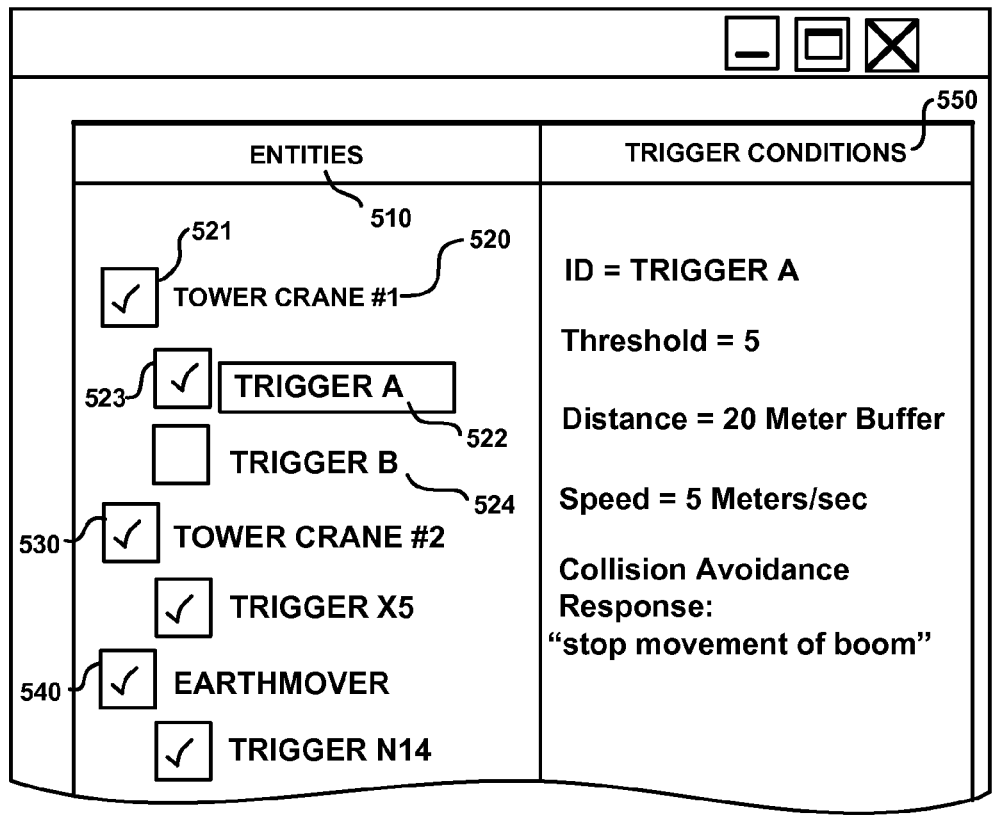
FIG. 5 is portion of an example graphical interface, in accordance with one embodiment.

FIG. 5 shows a portion of an example graphical interface 500 of entity assigner 330. As shown in graphical interface 500, names (e.g., 520, 530, and 540) associated with a plurality of entities are displayed. Each named entity may be assigned or unassigned for collision avoidance tracking by interacting with a selectable region (e.g., region 521). Accompanying each named entity is a listing of the trigger or triggers associated with that named entity. For example, triggers 522 and 524 are shown beneath named entity 520. Each trigger may be set or disabled by selecting a region displayed near the trigger (e.g., region 523). Likewise, by selecting a particular trigger, such as trigger 522, trigger conditions 550 for the trigger are displayed so that a user may view and or modify the trigger conditions for the selected trigger.

Referring again to FIG. 3, trigger tracker 340 is configured for evaluating the information received by collision avoidance module 230. The information is evaluated for occurrence of one or more of a plurality of triggers. To do this, trigger tracker 340 evaluates the received information for the occurrence of the combination of conditions of each trigger monitored by collision avoidance module 230.

Collision alert messenger 350 is configured for issuing a collision alert message and/or collision avoidance action for one or more entities in response to occurrence of one of a plurality of triggers. Thus, when collision alert messenger 350 receives notification of the occurrence of a trigger associated with an entity, collision alert messenger 350 issues a collision alert message for that entity. In some embodiments, the content of the collision alert message is dictated by a threshold value associated with the trigger or by a specific collision avoidance action specified as part of a trigger. A collision alert message comprises an electronic message containing identification information to direct its transmission to one or more entities and/or a collision avoidance device 600 coupled with an entity (or a plurality of collision avoidances devices 600 each coupled with a separate entity). The collision alert message may take many forms, such as streamed data, text message, cellular phone call, email, or other data carrying electronic formats. The collision alert message will also typically comprise a threshold value and or a specified collision avoidance action which should be taken by an entity.

For example in one embodiment each trigger includes a threshold value of between 1 and 10, with lower numbers indicating or associated with greater collision danger and closer proximity to an entity. Following this example, in one embodiment a collision alert messages also includes a threshold scaled from 1 to 10, with lower threshold values corresponding to more severe collision alert messages. In one embodiment, the threshold value of the trigger is simply incorporated as the threshold value of the collision alert message. In another embodiment a specific collision avoidance action, such as "engage hazard lights," "sound horn," "stop engine," "stop motor," or "apply brakes," is associated with a particular trigger or threshold value in a trigger, and this specific collision avoidance action is included in the collision alert message issued upon occurrence of the trigger.

Example Job Site Collision Avoidance Device

Figure 6:
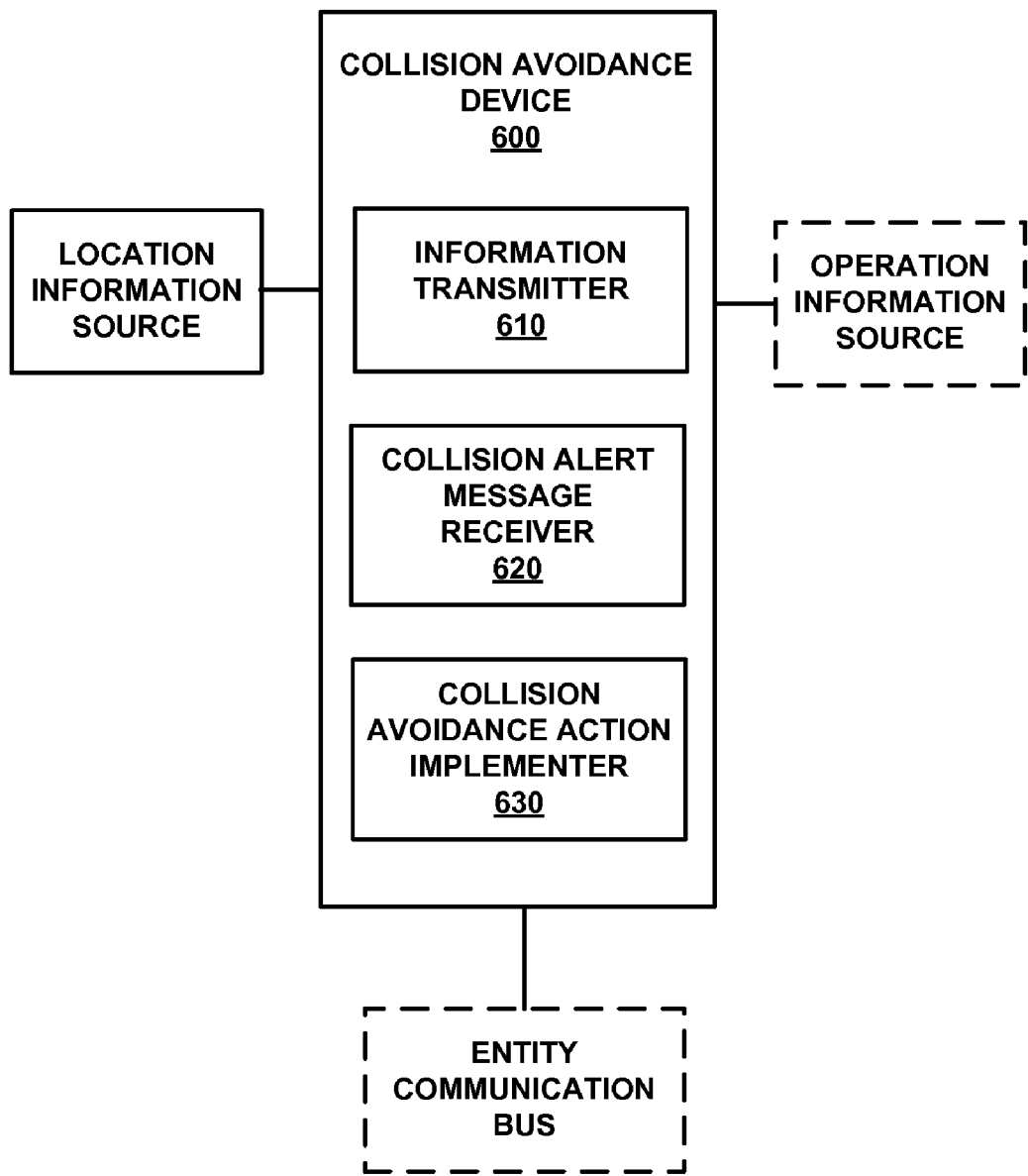
FIG. 6 is a block diagram of an example collision avoidance device, in accordance with one embodiment.

FIG. 6 is a block diagram of an example collision avoidance device 600, in accordance with one embodiment. In one embodiment, collision avoidance device 600 is coupled with a physical entity which operates, works, or is located on or proximate to a job site. In such an embodiment, collision avoidance device 600 operates as a job site collision avoidance device which interacts with collision avoidance system 200 (FIG. 2) to assist entities in the avoidance of collisions on a job site by increasing situational awareness and, in some instances, by intervening in the operation of a physical entity. In one embodiment, one or more of a plurality of physical entities on a job site is equipped with its own separate collision avoidance device 600.

As shown in FIG. 6, in one embodiment, job site collision avoidance device 600 is comprised of an information transmitter 610, a collision alert message receiver 620, and a collision avoidance action implementer 630.

Information transmitter 610 wirelessly transmits information regarding the location and/or operation of an entity to which it is coupled. The transmitted information includes location information and/or operation information regarding the entity to which device 600 is coupled. In one embodiment, this information is transmitted wirelessly to data transceiver 210 of collision avoidance system 200. Information transmitter 610 operates to wirelessly to transmit information in one or more well known fashions, such as via Bluetooth, via WiMax, via cellular telephone or radio, via one of the Institute of Electrical and Electronics Engineers 802.1 family of standards, or via other wireless data communication standard or protocol. In one embodiment, this information is transmitted on a periodic basis, such at an interval of 0.1 seconds, an interval of 5 seconds, or some other interval. In one embodiment, such information is transmitted at variable intervals, such as more frequently when the information is changing and less frequently when it remains static.

In one embodiment information transmitter 610 is coupled with a location information source which provides location information regarding the entity to which device 600 is coupled. In one embodiment, the location information source is included as a component or module of collision avoidance device 600. For example, in one embodiment, information transmitter 610 is coupled with a global navigation satellite system (GNSS) receiver with positioning capabilities based on signals from Galileo, GPS (Global Positioning System), Glonass, WAAS (Wide Area Augmentation Service), Egnos and the like. Such a location information source provides two-dimensional and/or three-dimensional location information regarding the entity to which device 600 is coupled. Such a location information source may also provide heading and or speed of an entity.

By way of example, and not of limitation, in one embodiment, entity 205B is a construction foreman's truck. An information transmitter 610 coupled with entity 205B may transmit location information indicating that entity 205B is located at latitude N37.19.11 latitude, W95.29.15 Longitude, and 11 meters ASL (above sea level). It is appreciated that such location information may be reported in a different manner, such as an offset from a particular reference point on a job site. It is also appreciated that such information may be reported with a greater or lesser degree of precision.

In one embodiment information transmitter 610 is coupled with an operation information source which provides operation information regarding the entity to which device 600 is coupled. For example, in one embodiment, information transmitter 610 is communicatively coupled with a J-bus, CAN (Controller Area Network) bus or other similar communications bus of a vehicle, crane, crane boom, or a construction equipment asset. Such operation information may include information which indicates whether the entity is operating and how fast the entity is moving, how much the entity weighs, and what mode the entity is currently in (e.g., lifting, hauling, grading, dumping, and etc.). For example, for entity 205A, information transmitter 610 may transmit operation information indicating that entity 205A is operating, is in reverse gear, is moving at a speed of 10 meters per second, and weighs 2000 Kilograms.

Collision alert message receiver 620 wirelessly receives a collision alert message. In one embodiment, the collision alert message is transmitted from collision avoidance system 200 for the entity with which device 600 is coupled. Collision alert message receiver 620 operates to wirelessly receive information in one or more well known fashions, such as via Bluetooth, via WiMax, via cellular telephone or radio, via one of the Institute of Electrical and Electronics Engineers 802.1 family of standards, or via another wireless data communication standard or protocol. Collision alert message receiver 620 forwards a received collision alert message to collision avoidance action implementer 630.

Collision avoidance action implementer 630 implements a collision avoidance action in response to receiving a collision alert message. The purpose of implementing a collision avoidance action is to avoid a potential collision between a first entity on a job site and a second entity on a job site. Collision avoidance action implementer 630 is capable of implementing collision avoidance actions including: an operator notification, an audible warning, a visible warning, and an entity operation intervention (e.g., a machine control action to intervene in the operation of one or more entities for the purpose of avoiding a collision).

Example Method of Operation

The following discussion sets forth in detail the operation of some example systems, devices, and methods of operation of embodiments described herein. With reference to FIG. 7 and flow diagram 700, example steps used by various embodiments of the present technology are illustrated. Flow diagram 700 describes a process that, in various embodiments, is carried out by a processor under the control of computer-readable and computer-executable instructions. The computer-readable and computer-executable instructions reside, for example, in data storage features such as computer usable/readable volatile memory 104, computer usable/readable non-volatile memory 106, or computer useable/readable storage device 118 of computer system 100 (all shown in FIG. 1). The computer-readable and computer-executable instructions, which may reside on computer useable/readable media, are used to control or operate in conjunction with, for example, processor 102 of FIG. 1. Although specific steps are disclosed in flow diagram 700, such steps are examples. That is, embodiments are well suited to performing various other steps or variations of the steps recited. It is appreciated that the steps in flow diagram 700 may be performed in an order different than presented, and that not all of the steps in flow diagram 700 may be performed.

Avoiding a Collision on a Job Site

FIG. 7 illustrates a flow diagram 700 of an example method for avoiding a collision on a job site, in accordance with one embodiment. In the examples provide below, the operation of method of flow diagram 700 is illustrated utilizing the functionality of system 200 and device 600 to avoid a potential collision between an entity and a second entity on a job site.

At 710 of flow diagram 700, in one embodiment, the method receives information regarding a plurality of selected entities on a job site. In one embodiment, the information is received at a location independent from the entities. For example, one embodiment utilizes data transceiver 210 to wirelessly receive information regarding a plurality of entities on a job site. Data transceiver 210 then forwards received information to real time server 220, which then in turn forwards the information to a subscribed module, such as collision avoidance module 230. This succinctly illustrates one example of a manner in which collision avoidance module 230 receives information regarding one or more of a plurality of assets on a job site.

In one embodiment, data transceiver 210 may receive information from a single entity (e.g., 205A), such as a vehicle. For example, data transceiver 210 receives such information from a collision avoidance device, such as collision avoidance device 600 (FIG. 6), which is coupled to the entity. In another embodiment, data transceiver 210 receives information from a plurality of entities (e.g., 205A, 205B, 205C, 205D, 205E, 205F, and etc.). For example, data transceiver 210 receives such information from a plurality of collision avoidance devices (such as collision avoidance device 600), each coupled to one of a plurality of entities which are on or proximate to a job site. In such an embodiment, each collision avoidance device 600 transmits information to data transceiver 210 regarding the entity to which it is coupled.

The received information may comprise location information regarding an entity and/or operation information regarding an entity equipped with a collision avoidance device 600. In one example, when a crane boom or its crane is equipped with a collision avoidance device, the received information comprises the location of a crane boom in three dimensions, and/or the operation of the crane boom (e.g., loaded and swinging clockwise at 2 meters per second). In another example, this may comprise the location of a vehicle or construction equipment asset in two or three dimensions, along with operation information (e.g., vehicle running and moving Northwest at 20 meters per second). In yet another example, this information comprises a two-dimensional or three-dimensional location of a person carrying a collision avoidance device.

In some embodiments, the information is forwarded from data transceiver 210 to real time server 220 and then to collision avoidance module 230 in the same data format and/or context in which the information is received by data transceiver 210.

In other embodiments, collision avoidance module 230 receives the information in a triplet data format, where the triplet data format comprises an entity identification field, a value field, and a units field associated with the value field. For example, data transceiver 210 parses the received information and converts it into a uniform context called "triplet information," or otherwise known as "triplets," "triplet format," or "triplet data," and then forwards the triplet information. For example, data transceiver 210 parses and converts to triplet information, from a received communication regarding the two-dimensional location and operation of entity 205A, a vehicle. It is appreciated that the entity identification field may be identify an entity at a top level or else identify a more specific measure of a quantity or a quality associated with an entity. For example, the entity identification may identify a certain vehicle such as a particular bulldozer in a fleet of bulldozers (e.g., "bulldozer_75"). The entity identification may also be a more specific entity quantity identification or entity quality identification. An example of an entity quantity identification is the fuel level of a vehicle such as the particular bull dozer (e.g., "bulldozer_75_fuel"). An example of an entity quality identification is the directional heading of a vehicle such as the particular bull dozer (e.g., "bulldozer_75_heading").

Examples of resulting location information triplets for entity 205A are shown in Table 1. Some examples of operation information triplets pertaining to entity 205A are shown in Table 2. It is appreciated that such triplet information shown in Tables 1 and 2 may be parsed and converted from a variety of data formats such as steaming data, encrypted data, text files, email messages, and other data formats. Such triplets as shown in Tables 1 and 2 are then forwarded by data transceiver 210 to real time server 220. The unit portion of the triplet data may be optional if all the applications in the network assume a known unit system (e.g., Metric, English, etc). Thus, it is appreciated that in other embodiments, collision avoidance module 230 may receive information in other formats, such as a duet format comprised of an entity quantity identification/entity quality identification and the value (e.g., a duet).

TABLE 1

Examples of Location Information Converted to Triplet Information Format

| I.D. | Value | Units |
|---|---|---|
| Vehicle1_n, | 37.19.10, | North Latitude |
| Vehicle1_e, | 95.29.15, | West Longitude |
| Vehicle1_h, | 110, | Directional Heading in Degrees |

TABLE 2

Examples of Operation Information Converted to Triplet Information Format

| I.D. | Value | Units |
|---|---|---|
| Vehicle1_w, | 2000, | Kilograms |
| Vehicle1_spd, | 25, | Meters Per Second |

Converting received information into a triplets format is not required by the presented technology. However, converting received information into triplets format allows information received in a wide variety of formats to be standardized to a single format, thus eliminating repetitive parsing of the information at follow-on stages of processing which utilize the information. Additionally, converting and working with information in triplets format eliminates surplus data that is often received along with received information. It follows that by reducing the overall amount of data in this fashion, the rapidity of information communication/transmission may be increased and/or the bandwidth requirements for communication/transmission of information may be decreased; both of which are beneficial to the conduct of real time operations.

At 720 of flow diagram 700, in one embodiment, the method evaluates the information to determine whether a trigger has occurred. The trigger is associated with a potential collision situation involving an entity of the entities for which information has been received by collision avoidance module 230. In one embodiment, this comprises collision avoidance module 230 evaluating selected portions of the information it has received. For example, trigger tracker 340 evaluates received information for the occurrence of a trigger associated with a potential collision situation involving an entity (e.g., 205A) of the plurality of entities (e.g., 205A, 205B, 205C, 205D, 205E, 205F) which collision avoidance module 230 subscribes to and receives information regarding. To do this, trigger tracker 340 evaluates the information received in collision avoidance module 230 for the occurrence of the combination of conditions of each trigger monitored by collision avoidance module 230.

A trigger is a condition or set of conditions regarding the operation of an entity with respect to another entity, the occurrence of which triggers a collision alert message. A trigger is based upon situational factors obtainable from the selected information, such as speed of an entity, location on a job site, type of an entity, type of another entity near the entity (e.g., an a second entity that the first entity may be on a collision course with), and/or two-dimensional/three-dimensional location of an entity relative to another entity. In response to a set of conditions being met for occurrence of a trigger, collision avoidance module 230 issues a pre-selected collision alert message or action command to at least one entity. It is appreciated that such a trigger can be set or modified utilizing entity assigner 330.

The evaluation of information to determine whether a trigger has occurred can include, but is not limited to: evaluating a location of an entity on a job site to determine whether a trigger has occurred; comparing the location of an entity with a location of a second entity of plurality of selected (tracked) entities to determine whether a trigger has occurred; comparing the location of an entity to a location of a virtual entity to determine whether a trigger has occurred; evaluating operation information of an entity to determine whether a trigger has occurred.

In one embodiment, for example, entity 205A is a vehicle on a job site. During a day when blasting is being conducted on the job site, a trigger is set to occur for entity 205A if it enters a zone that is within 100 meters of the coordinates of a blasting area on the job site. Thus, in an instance where received information indicates that entity 205A is within 95 meters of the coordinates of the blasting area, trigger tracker 340 will evaluate the received information and determine that this trigger has occurred. Trigger tracker 340 then reports the occurrence of this trigger to collision alert messenger 350. This is an example of evaluating a location of an entity on a job site to determine whether a trigger has occurred.

In another embodiment, for example, entity 205C is the crane boom of a first tower crane at a job site and entity 205D is the crane boom of a second tower crane at the same job site. A trigger is set to occur for entity 205C whenever another entity of the job site enters a zone extending in a 10 meter three-dimensional volume surrounding entity 205C. Thus, in an instance where received information from either entity 205C or entity 205D indicates that entity 205C is within nine meters of entity 205D, trigger tracker 340 will evaluate the received information and determine that this trigger has occurred. Trigger tracker 340 then reports the occurrence of this trigger to collision alert messenger 350. This is an example of comparing the location of an entity with a location of a second entity of plurality of selected (tracked) entities to determine whether a trigger has occurred.

In yet another embodiment, for example, entity 205E is a construction equipment asset such as an earth mover. With reference to displayed viewable rendering 400 of FIG. 4, a saguaro cactus 401 is surrounded by a geo-fence 420. A trigger is set to occur for entity 205E if it is operating in reverse and enters a location within geo-fence 420. Thus, in an instance where received information indicates that entity 205E is within geo-fence 420, trigger tracker 340 will evaluate the received information and determine that this trigger has occurred. Trigger tracker 340 then reports the occurrence of this trigger to collision alert messenger 350. This is an example of comparing the location of the entity to a location of a virtual entity to determine whether a trigger has occurred. This is also an example of evaluating operation information of an entity to determine whether a trigger has occurred.

At 730 of flow diagram 700, in one embodiment, the method issues a collision alert message for the entity if the trigger has occurred. In one embodiment, collision alert messenger 350 issues a collision alert message in response to being notified by trigger tracker 340 of the occurrence of a trigger. In some embodiments, the type and content of the collision alert message are dictated by a threshold associated with the trigger or a specific collision avoidance action specified as part of a trigger. In one embodiment, the issued collision message is routed via real time server 220 to data transceiver 210, which then wirelessly transmits the collision alert message for an entity. In one embodiment, this comprises transmitting the collision alert message to a collision avoidance device 600 coupled with an entity. As previously described, information transceiver 210 may be on or proximal to a job site, or located a great distance from a job site. Additionally, as previously described, information transceiver 210 is typically located independent of the location of an entity from which it receives information/to which it transmits information. Thus, in one embodiment, the collision alert message is wirelessly transmitted from a location independent of the entity or entities to which the message is being transmitted.

Following the previous example involving vehicle 205A, collision alert messenger 350 receives notification of the occurrence of a trigger associated with entity 205A. In response, collision alert messenger 350 issues a collision alert message (collision alert message A) for entity 205A.

Following the previous example involving crane booms 205C and 205D, collision alert messenger 350 receives notification of the occurrence of a trigger associated with entity 205C. In response, collision alert messenger 350 issues a collision alert message (collision alert message B) for entity 205C.

Following the previous example involving earth mover 205E, collision alert messenger 350 receives notification of the occurrence of a trigger associated with entity 205E. In response, collision alert messenger 350 issues a collision alert message (collision alert message C) for entity 205E.

In one embodiment, the method of flow diagram 700 further comprises setting a condition for occurrence of a trigger. As previously discussed, the conditions for the occurrence of a trigger can be set or modified utilizing entity assigner 330. In some instances, the triggers and conditions thereof are automatically set based upon pre-defined safe operating conditions and rule for a particular type of entity. For example, an automatic trigger may exist such that a collision alert message is generated anytime earth mover 205E is operated in reverse within 5 meters of person, such as person 205F, who is being tracked by collision avoidance module 230. In one embodiment, in response to muddy conditions on a job site, a user may add a second trigger to occur when earthmover 205E is operated in reverse within 10 meters of person 205F.

In one embodiment the method of flow diagram 700 further comprises, continuing the receiving and evaluating, which was described in conjunction with flow diagram steps 710 and 720, to determine whether an additional trigger has occurred, and issuing an additional collision alert message if the additional trigger has occurred. The additional trigger being an additional potential collision situation involving the entity.

Referring to the example illustrated above by earthmover 205E, in one embodiment, when earthmover 205E is operated in reverse within 10 meters of person 205F, a condition for a first trigger will have occurred. In response to evaluating received information, trigger tracker 340 notifies collision alert messenger regarding the occurrence of the first trigger. Collision alert messenger 350 sends out an appropriate collision alert message (collision alert message D) in response to the occurrence of this first trigger. If earthmover 205E is then operated until it is within 5 meters of person 205F, a second condition will have been met for a second trigger to occur. In response to continuing to evaluate received information, trigger tracker 340 notifies collision alert messenger 350 regarding the occurrence of the second trigger. Collision alert messenger 350 sends out an appropriate collision alert message (collision alert message E) in response to the occurrence of this second trigger.

In one embodiment the method of flow diagram 700 further comprises, receiving a collision alert message at an entity, and in response to the collision alert message, automatically implementing a collision avoidance action at the entity. The collision alert avoidance action is meant to assist in avoiding a collision between a first entity and a second entity on a job site.

It is appreciated that the first entity may be a person, a vehicle, a crane, a crane boom, a construction equipment asset, or another static or mobile physical entity on or proximate to a job site. The second entity to be avoided may likewise be a person, a vehicle, a crane, a crane boom, a construction equipment asset, or another static or mobile physical entity on or proximate to a job site. Additionally either the first entity or the second entity to be avoided may comprise a virtual entity such as a geo-fence or other virtual boundary established on or proximate to a job site.

In one embodiment, the collision alert message is transmitted from collision avoidance system 200 for the entity with which a collision avoidance device 600 is coupled. In such an embodiment, collision alert message receiver 620 is used to wirelessly receive the collision alert message. Collision alert message receiver 620 then forwards this message to collision avoidance action implementer 630.

Collision avoidance action implementer 630 implements a collision avoidance action at an entity in response to receiving a collision alert message for the entity. Collision avoidance action implementer 630 is capable of implementing collision avoidance actions including: an operator notification, an audible warning, a visible warning, and an entity operation intervention (e.g., a machine control action to intervene in the operation of one or more entities for the purpose of avoiding a collision).

In some embodiments, the nature of the collision avoidance action implemented is specified by the collision alert message. In other embodiments, the nature of the collision avoidance action depends upon the threshold value included in the collision alert message and the range of collision avoidance actions available with respect to a particular entity with which collision avoidance action implementer 630 is coupled. Thus, in an embodiment where a wide range of collision avoidance actions are available, differing collision avoidance actions (or combinations of collision avoidance actions) may be associated with different threshold values. Conversely, where only one collision avoidance action is available, that single collision avoidance action may be associated with a wide range or all threshold values.

In one embodiment, in response to receiving a collision alert message, collision avoidance action implementer 630 implements a collision avoidance action which provides an operator notification. An example of such an operator notification is a text message on a display (e.g., on a computer display, a cellular telephone display, or a display coupled to device 600). Another example of an operator notification is a vibration (e.g., a vibrating cellular phone, collision avoidance device 600, steering mechanism, or seat). In one embodiment, an operator notification in the form of a message stating, "Collision Imminent!" is displayed on a display of an entity, in response to receiving collision alert message A. In one embodiment, an operator notification in the form of a vibrating driver's seat is taken in response to receiving collision alert message D.

In one embodiment, in response to receiving a collision alert message, collision avoidance action implementer 630 implements a collision avoidance action which provides an audible warning. Some examples of an audible warning include a specific ring on a cellular telephone; a honking of a horn attached to an entity; and an audible announcement or warning tone enunciated from a speaker coupled to an entity or to a collision avoidance device 600. In one embodiment, an audible warning in the form of honking a horn is taken in response to receiving collision alert message C.

In one embodiment, in response to receiving a collision alert message, collision avoidance action implementer 630 implements a collision avoidance action which provides a visible warning. Some examples of a visible warning include: flashing the dash lights or other interior lights; engaging hazard lights, flashing or otherwise engaging headlamps or other external illumination devices an entity; illuminating a warning indicator on or within an entity; illuminating a yellow or red indicator of a "virtual stoplight" (e.g., a panel comprised of red, yellow, and green indicator lights and mounted on or within a vehicle), and illuminating a warning indicator coupled to a collision avoidance device 600. In one embodiment, a visible warning in the form of illuminating a warning light is taken in response to receiving collision alert message E.

In one embodiment, in response to receiving a collision alert message, collision avoidance action implementer 630 implements a collision avoidance action which intervenes into the operation of the first entity for the purpose of averting a collision with the second entity. In one embodiment, for example, collision avoidance action implementer 630 is coupled with a J-bus, CAN-bus or other communication bus linked to a motor, engine, steerage, and/or braking system of a vehicle, crane, crane boom, or a construction equipment asset. Via such a coupling to a communication bus or via other mechanical, electrical, or electro-mechanical coupling to such systems, collision avoidance action implementer 630 implements a collision avoidance action, such as: limiting or halting revolutions of a motor or engine, limiting upper speed of an vehicle or construction equipment asset, applying a brake, halting or slowing radial swing of a crane boom, and/or adjusting a direction of travel of an entity or a portion of an entity. In one embodiment, an entity operation intervention action in the form of a stopping the movement of crane boom 205C is taken in response to receiving collision alert message B.

Some other examples of intervening in the operation of an entity, include governing the top speed of a vehicle or construction equipment asset when inside a region protected by a geo-fence; applying brakes in vehicle or construction equipment asset to avoid a collision with a person or another vehicle or construction equipment asset; stopping or slowing second vehicle or construction equipment asset to avoid a collision with a first vehicle or construction equipment asset, stopping or slowing multiple vehicles or construction equipment assets to avoid a collision between two or more of the multiple vehicles or construction equipment assets; and stopping or slowing the movement/rotation of a crane boom to avoid a collision with another crane boom, building, vehicle, virtual protected region, or construction equipment asset.

Method and System for Automatically Directing Traffic on a Site

Figure 8:
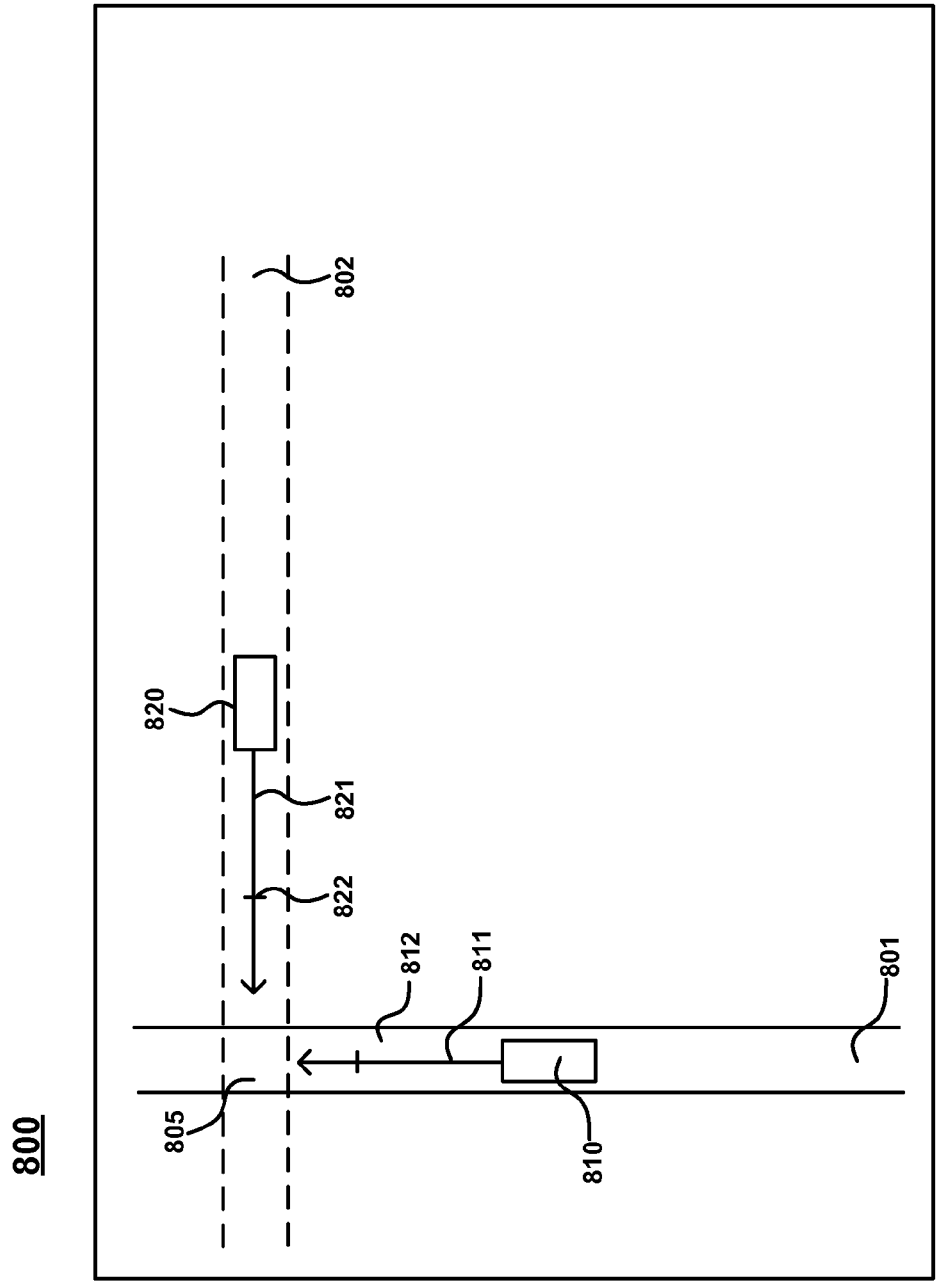
FIG. 8 is an example of a displayed visual rendering of entities on a job site, in accordance with one embodiment.

FIG. 8 is an example of a displayed visual rendering (e.g., by viewer module 320 of FIG. 3) of entities on a job site, in accordance with one embodiment. As shown in FIG. 8, a job site 800 is displayed in which a road 801 is intersected by a second road 802 at an intersection 805. In one embodiment, the coordinates of road 801 and/or road 802 are entered into collision avoidance system 200 when job site 800 is mapped into collision avoidance module 230. In one embodiment of the technology, collision avoidance module 230 can receive an indication of an assigned priority for a vehicle within site 800 based upon a variety of characteristics. In one embodiment of the technology, collision avoidance module 230 compares the priority assigned to one or more vehicles and determines which of those vehicles has right of way. In other words, the vehicle with the highest assigned priority is granted right of way over the vehicle(s) assigned a lower priority. It is noted that the present technology is not limited to defined roads within a site. As described above, if the projected track of a vehicle on a job site is likely to intersect the projected track of a second vehicle on the job site, collision avoidance module 230 can generate a collision alert message to give one of the vehicles the right of way. The use of roads in FIG. 8 is instead to more clearly illustrate where the projected tracks of the vehicles will intersect and is not intended to convey that embodiments of the technology are limited to defined roads on site 800.

As discussed above with reference to FIG. 3, collision avoidance module 230 can be used to assign characteristics to an entity within job site 800. This can include the type of vehicle, the vehicle's weight, or other characteristics such as the cargo carried by the vehicle. Thus, a vehicle carrying supplies or construction materials onto a job site may be assigned a higher priority than an empty vehicle, or a vehicle carrying refuse. Similarly, a vehicle carrying logs out of a logging site may be assigned a higher priority than an empty vehicle. Alternatively, a heavier vehicle may be assigned a higher priority than a lighter vehicle. It is noted that the priority assigned to a vehicle may be dynamically updated according to changing conditions on job site 800.

In one embodiment, roads or other pathways within job site 800 may also be assigned characteristics. For example, collision avoidance module 230 may be configured to show that road 801 is a paved road while road 802 is an unpaved road. Additionally, viewer module 320 may display road 801 in a different manner than road 802 based upon an assigned characteristic. For example, in FIG. 8 road 801 is a paved road and is displayed with a solid line while road 802 is an unpaved road and is displayed with a broken line.

In one embodiment, roads within job site 800 may also be assigned a higher priority, or right of way, based upon, but not limited to, the type of road it is (e.g., paved, unpaved, etc.), where the road leads to within the job site, traffic conditions, terrain, road conditions, or other factors. It is also noted that the priority assigned to a road may be dynamically updated according to changing conditions on job site 800.

As shown in FIG. 8, a vehicle 810 upon road 801 is approaching intersection 805. Similarly, a second vehicle 820 on road 802 is also approaching intersection 805. In one embodiment, collision avoidance module 230 can determine whether a collision between vehicle 810 and vehicle 820 is likely. For example, vehicle 820 may be moving slowly enough that vehicle 810 can safely pass through intersection 805. However, if collision avoidance module 230 determines that that a collision is likely, based upon the position, speed and course of vehicles 810 and 820, it will generate a collision alert message(s) to one or both of vehicles 810 and/or 820. In one embodiment, the collision alert message is for causing the operator(s) of one, or both, of vehicles 810 and/or 820 to stop, or reduce speed prior to entering intersection 805. Thus, collision avoidance module can function as a virtual stoplight for job site 800. In one embodiment, collision avoidance module 230 generates the collision alert message based upon the priority assigned to vehicles 810 and 820. For example, if vehicle 820 has a higher assigned priority based upon its weight, a collision alert message may only be sent to vehicle 810 causing the operator to stop vehicle 810 prior to entering intersection 805. Thus, collision avoidance module 230 generates a signal indicating that vehicle 810 should yield right of way at intersection 805. It is again noted that the collision alert message may initiate any of the actions described above with reference to FIG. 3. In another example, vehicles on road 801 may be assigned a higher priority than vehicles on road 802. Thus, collision avoidance module 230 will generate a collision alert message to vehicle 820 indicating that the operator should stop vehicle 820 prior to entering intersection 805.

It is noted that a variety of characteristics may be assigned to a vehicle which may assign more than one priority to a vehicle. For example, vehicle 810 may have a higher priority due to the fact that it is traveling on road 801. However, vehicle 820 may have a higher priority due to its being a heavier vehicle. Thus, in one embodiment collision avoidance module may receive an indication of the ranking of the priorities assigned to a vehicle. For example, collision avoidance module 230 may receive an indication that the first priority to be considered when assigning right of way to a vehicle is the weight of the vehicle, the next priority to be considered is what road the vehicle is on, the next priority to be considered is what cargo the vehicle is carrying, etc.

Embodiments of the present technology are advantageous in situations in which visibility at a job site may be restricted. For example, terrain, vegetation, weather conditions, and dust may prevent the operator of a vehicle from seeing an approaching vehicle at an intersection, or from seeing traffic control measures such as signs which are in place at a job site. However, as will be discussed in greater below, embodiments of the present technology facilitate displaying traffic control information in each vehicle on a job site. As a result, the traffic control measures created at a job site will be visible to all operators of vehicles, or machinery, at a job site in spite of low visibility conditions which may inhibit safe operation at the job site.

In one embodiment, the speed and braking distance associated with each vehicle on job site 800 can also be displayed. In FIG. 8, a first arrow 811 indicates how far vehicle 810 will travel at its current speed within a given time period. For example, arrow 811 shows how far vehicle 810 will travel in 5 seconds at its current speed. A tick mark 812 on arrow 811 shows an estimate of how far vehicle 810 will travel if the brakes are applied (e.g., an estimated braking distance). Similarly, an arrow 821 shows how far vehicle 820 will travel in 5 seconds at its current speed. Tick mark 822 shows an estimate of how far vehicle 820 will travel if its brakes are applied (e.g., an estimated braking distance). It is noted that the estimated braking distance for vehicles 810 and 820 may based upon a variety of factors such as brake wear, speed, weight, traction, etc. which may be recorded by system 200. Furthermore, the estimated braking distance may be based upon the assumption of an average braking force applied by vehicles 810 and 820 rather than the maximum braking force possible. In one embodiment, right of way at intersection 805 may be based upon the current speed, or the estimated braking distance, associated with one of the vehicles. For example, collision avoidance module 230 may determine that vehicle 820 may not be able to stop prior to entering intersection 805 based upon its current speed, weight, estimated braking distance, road surface, etc. Thus, while vehicle 810 may normally have the right of way at intersection 805 based upon the priority assigned to it, vehicle 820 may be given the right.

In one embodiment, rather than causing one, or both, vehicles to come to a complete stop, collision avoidance module 230 generates a collision alert message to one, or both, of the vehicles which instructs the operator to alter the speed of that vehicle. For example, if road 801 has a higher priority than road 802, collision avoidance module 230 generates a collision alert message to vehicle 820 instructing the operator of vehicle 820 to slow down to avoid a collision with vehicle 810. Collision avoidance module 230 may also generate a collision alert message to the operator of vehicle 810 to adjust the speed (e.g., speed up, or slow down) of vehicle 810. In one embodiment, collision avoidance module 230 can determine a speed for vehicle 820 which will permit it to continue without risking a collision with vehicle 810. For example, if vehicle 820 is moving at 25 miles-per-hour, collision avoidance module 203 can generate a collision alert message instructing the driver of vehicle 820 to slow down to 15 miles-per-hour. In so doing, vehicle 810 can pass through intersection 805 without slowing, and vehicle 820 can pass through intersection 805 without coming to a complete stop. This is beneficial in conserving fuel and extending the brake life of vehicles on job site 800. As discussed above, collision avoidance action implementer 630 can also be used to limit the revolutions of a motor, limiting the upper speed of a vehicle, or applying a brake in response to receiving a collision alert message. Thus, the speed of vehicles approaching an intersection may be automatically controlled to permit them to pass through an intersection without colliding.

In one embodiment, a maximum speed is associated with roads within job site 800 as well. For example the maximum speed for road 801 may be 30 miles-per-hour while the maximum speed for road 802 may be 25 miles-per-hour. In one embodiment, when collision avoidance module 230 determines that a vehicle is exceeding the speed limit assigned to a road within job site 800, it generates a collision alert message which informs the operator of that vehicle that the maximum speed limit for that road is being exceeded. It is noted that the location of vehicles 810 and 820 may be determined using a satellite or terrestrial based position determining system. Examples of position determining systems used in accordance with the present technology include, but are not limited to, GNSS receivers, RFID systems, optical positioning systems or other types of RF position measurement systems.

The present technology permits collecting data to facilitate comparing expected performance metrics with actual performance metrics at job site 800. For example, as discussed above with reference to FIG. 7, system 200 can collect data on how much fuel a particular vehicle has remaining. This can be compared with expected fuel consumption figure to determine if too much fuel is being used, and to determine what actions may be implemented to reduce fuel consumption. In another example, system 200 can determine if machinery is left idling for excessive periods and generate a message to vehicle operators to shut down their vehicles if they have been idling for longer than a pre-determined time interval.

Additionally, system 200 can be used to monitor traffic control on job site 800 to determine if traffic is being routed efficiently, or if changes in the traffic pattern are desirable. For example, if excessive traffic is passing through intersection 805 of job site 800, system 200 may direct some of the traffic around intersection 805 order to reduce the traffic load. In one embodiment, system 200 can change the priority assigned to a road within job site 800 to allow traffic that is backing up on that road to proceed. For example, if a large number of vehicles have collected on road 802 because traffic on road 801 has had priority, system 200 can assign a higher priority to road 802 until the congested traffic has dissipated. In another example, if traffic is becoming congested on job site 800, system 200 can be used to increase the maximum speed allowed on some, or all, of the roads on the job site in order to dissipate the traffic.

Embodiments of the present technology facilitate creating a traffic control infrastructure on a job site without the necessity of physically installing speed limit signs, right of way signs, or traffic lights. This reduces the costs associated with the materials and time needed to implement traffic control measures on a job site. Additionally, because the priority for a vehicle or road can be dynamically changed in response to conditions, embodiments of the present technology maximize traffic flow based on current conditions rather than rely upon static traffic control measures.

Figure 9:
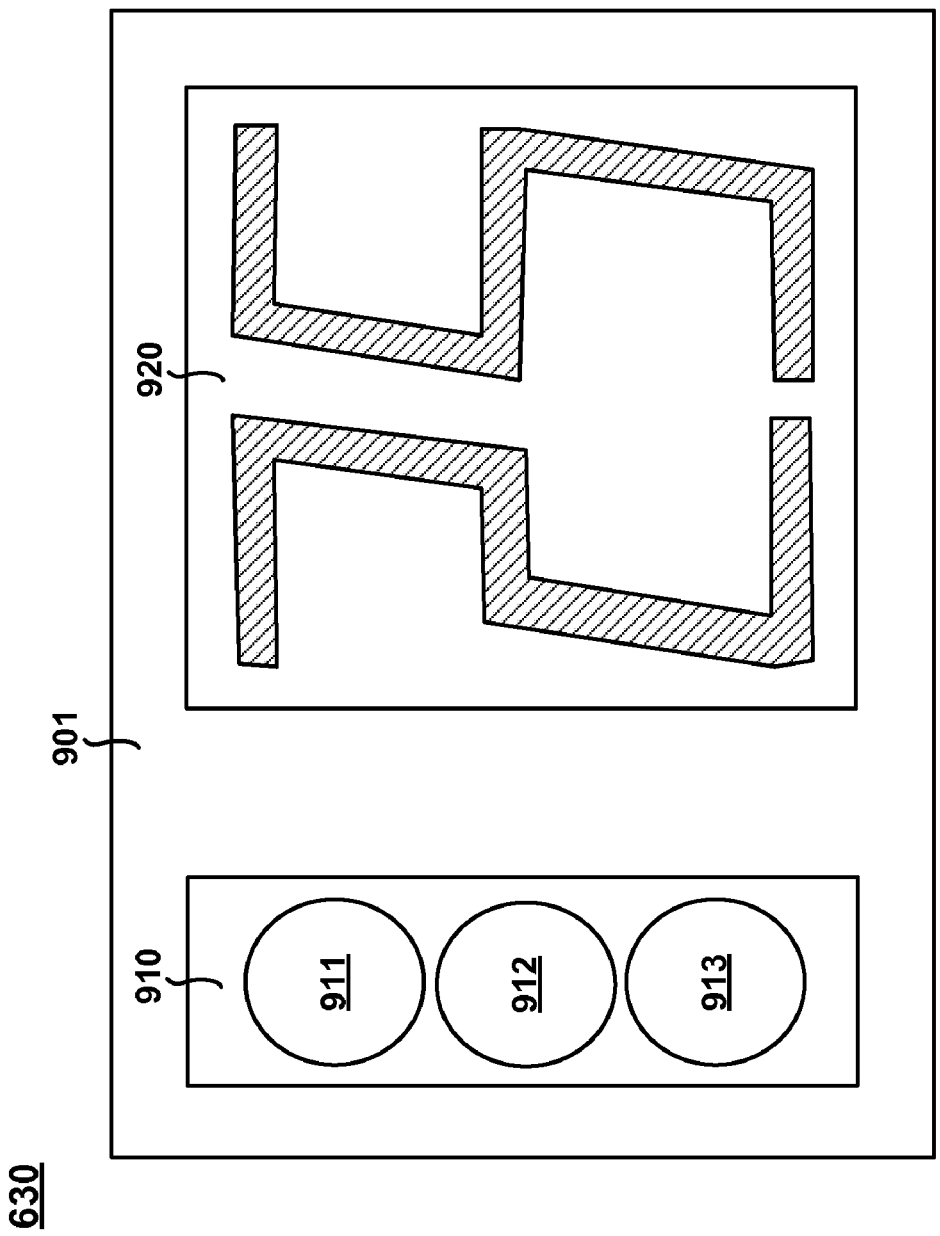
FIG. 9 is a front view of a collision action implementer in accordance with one embodiment.

FIG. 9 is a front view of a collision avoidance action implementer 630 in accordance with one embodiment of the present technology. In one embodiment of the present technology, collision avoidance action implementer 630 comprises a display screen 901 for displaying information to an operator of a construction equipment asset at a site. Typically, collision avoidance action implementer is mounted within the field of view of the operator such that information displayed upon display screen 901 can be seen by the operator. In one embodiment, display screen 901 may be mounted upon the windshield, dashboard, steering column, or other location within the construction equipment asset. In the embodiment of FIG. 9, display screen 901 comprises a first display region 910 and a second display region 920. In one embodiment, first display region 910 displays three indicator lights (e.g., 911, 912, and 913 of FIG. 9). In one embodiment, indicator light 911 is colored red, indicator light 912 is colored yellow, and indicator light 913 is colored green. In FIG. 9, second display region 920 shows a numerical indication of the maximum speed for a vehicle in which collision avoidance action implementer 630 is mounted. However, it is noted that second display region 920 may also display other information such as a map of job site 800, driving directions for navigation around job site 800, or other information.

During operation, collision avoidance action implementer 630 illuminates one of indicator lights 911, 912, or 913 according to traffic conditions within a job site. Thus, when collision avoidance module 230 determines that there is no imminent likelihood of a collision between a vehicle in which collision avoidance action implementer 630 is mounted and another vehicle, indicator light 913 (e.g., a green light) is illuminated indicating that the vehicle can proceed. However, if collision avoidance module 230 determines that a collision is possible, it may send a collision alert message to each of the vehicles which could potentially be involved in the collision. In response to the collision alert message. collision avoidance action implementer 630 may illuminate indicator light 912 (e.g., a yellow light) in one, or both, of the vehicles which could potentially be involved in the collision. Referring again to FIG. 8, if vehicle 810 has been assigned a higher priority than vehicle 820, collision avoidance action implementer 630 in vehicle 810 may illuminate indicator light 912 to indicate that the potential for a collision at intersection 805. However, the collision avoidance action implementer 630 mount in vehicle 820 may illuminate indicator light 911 (e.g., a red light) indicating that vehicle 820 should come to a complete stop at intersection 805. Alternatively, the collision avoidance action implementer 630 mounted in vehicle 810 may continue to illuminate indicator light 913 indicating that vehicle 810 can proceed through the intersection without slowing down. In another alternative, the collision avoidance action implementer 630 mount in vehicle 820 may illuminate indicator light 912 indicating that vehicle 820 should reduce speed while second display region 920 indicates a new maximum speed for vehicle 820. Furthermore, collision avoidance action implementer 630 may also generate an audio alarm to attract the attention of an operator of a vehicle when a change in the status of first or second display regions 910 or 920 occurs. Collision avoidance action implementer 630 may also flash the indicator lights in display regions 910 until corrective action has been taken by the operator(s) of one or more of the vehicles approaching an intersection, or until the potential for a collision has passed. Again, the determination of what indicator lights, and/or speed displayed on a particular collision avoidance action implementer 630 is made by system 200 based upon one or more criteria for assigning priority to a vehicle or road within job site 800.

Figure 10:
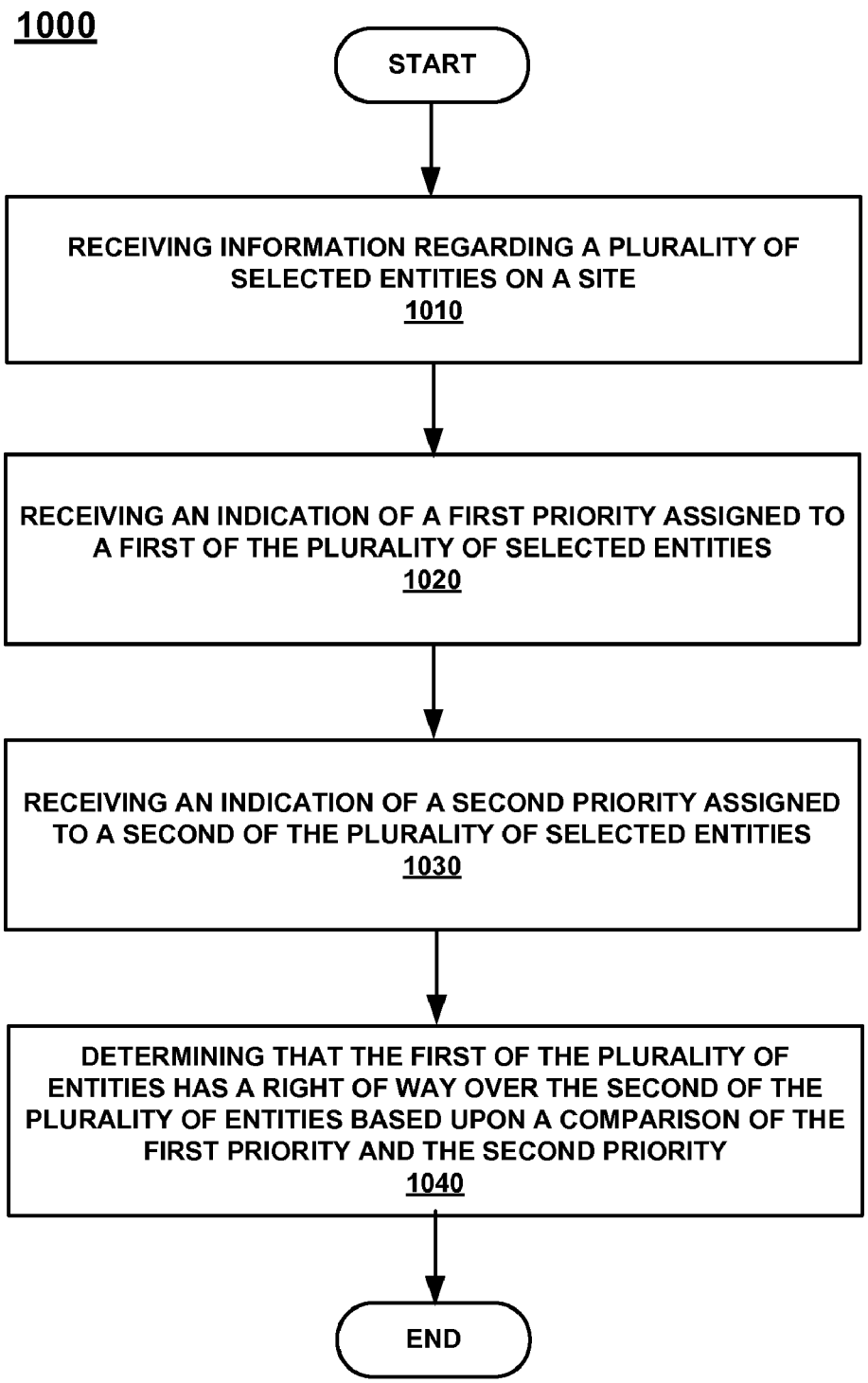
FIG. 10 is a flowchart of a method for automatically directing traffic on a site in accordance with one embodiment.

FIG. 10 is a flow diagram 1000 of a method for automatically directing traffic on a site in accordance with one embodiment. With reference to FIG. 10 and flow diagram 1000, example steps used by various embodiments of the present technology are illustrated. Flow diagram 1000 describes a process that, in various embodiments, is carried out by a processor under the control of computer-readable and computer-executable instructions. The computer-readable and computer-executable instructions reside, for example, in data storage features such as computer usable/readable volatile memory 104, computer usable/readable non-volatile memory 106, or computer useable/readable storage device 118 of computer system 100 (all shown in FIG. 1). The computer-readable and computer-executable instructions, which may reside on computer useable/readable media, are used to control or operate in conjunction with, for example, processor 102 of FIG. 1. Although specific steps are disclosed in flow diagram 1000, such steps are examples. That is, embodiments are well suited to performing various other steps or variations of the steps recited. It is appreciated that the steps in flow diagram 1000 may be performed in an order different than presented, and that not all of the steps in flow diagram 1000 may be performed.

In operation 1010 of FIG. 10, information regarding a plurality of selected entities on a site is received. As described above with reference to operation 710 of FIG. 7, the information may comprise the weight, location, speed, and direction of travel of a vehicle (e.g., vehicles 810 and 820 of FIG. 8). As described above, the information may further comprise cargo being carried by a vehicle, a destination of a vehicle, traffic conditions on the site, terrain and/or weather conditions at the site, the estimated braking distance for a vehicle on the site, the amount of break wear of a vehicle, and/or the road on which the vehicle is currently traveling. In one embodiment, the information is received at a location independent from the entities. For example, one embodiment utilizes data transceiver 210 to wirelessly receive information regarding a plurality of entities on a job site. Data transceiver 210 then forwards received information to real time server 220, which then in turn forwards the information to a subscribed module, such as collision avoidance module 230.

In operation 1020 of FIG. 10, an indication of a first priority assigned to a first of the plurality of selected entities is received. In one embodiment, collision avoidance module 230 receives an assignment of a first priority for a vehicle on the site based upon one or more of the criteria listed above. It is noted that the criteria listed above are for purposes of illustration and are not intended to limit embodiments of the technology to those criteria alone. It is noted that the technology is not limited to vehicles alone. For example, a crane boom (e.g., 205C or 205D of FIG. 4), person (e.g., 205F), or other entity may be assigned a priority in accordance with the technology. As described above, collision avoidance module 230 can be configured to assign priority, or right of way, to a vehicle within site 800 based upon a variety of characteristics including, but not limited to, those listed above with reference to operation 1010.

In operation 1030 of FIG. 10, an indication of a second priority assigned to a second of the plurality of selected entities is received. Again, collision avoidance module 230 receives an assignment of a second priority for a second vehicle on the site based upon one or more of the criteria listed above. It is again noted that the criteria listed above with reference to operation 1010 illustrate some of the criteria used to assign a priority to, for example, a second vehicle on the job site.

In operation 1040 of FIG. 10, it is determined that the first of the plurality of entities has a right of way over the second of the plurality of entities based upon a comparison of the first priority and the second priority. As described above, the technology can determine which of the entities on a job site has priority, or right of way, over other entities on a job site. This is based upon a comparison of the first priority assigned to the first entity and the second priority assigned to the second entity. As described above, the comparison of priorities assigned to entities on a job site is performed by collision avoidance module 230 of FIG. 2 in one embodiment. As described above, when collision avoidance module 230 determines which vehicle has the right of way, it generates a collision alert message for causing one of the vehicles to yield right of way to the vehicle with the higher priority. In so doing, the technology facilitates implementing traffic control measures on a site without the necessity of physically emplacing signals, signs, or other measures on the site. Additionally, the technology facilitates dynamically prioritizing the entities on the job site as conditions such as traffic, weather, or safety measures may warrant.

Embodiments of the present technology are thus described. While the present technology has been described in particular embodiments, it should be appreciated that the present technology should not be construed as limited by such embodiments, but rather construed according to the following claims.

We claim:

1. A method for automatically directing traffic on a site, said method comprising:
   receiving information regarding a plurality of selected entities on a site;
   receiving an indication of a first priority assigned to a first of said plurality of selected entities;
   receiving an indication of a second priority assigned to a second of said plurality of selected entities, and wherein said first priority and said second priority are assigned based upon a cargo carried by said first of said plurality of selected entities and said second of said plurality of selected entities respectively; and
   determining that said first of said plurality of entities has a right of way over said second of said plurality of entities based upon a comparison of said first priority and said second priority.

2. The method as recited in claim 1 wherein said receiving an indication further comprises:

receiving an indication of at least one characteristic of said first of said plurality of selected entities and said second of said plurality of selected entities.

3. The method as recited in claim 2 further comprising:
receiving a ranking of said first priority and said second priority.

4. The method as recited in claim 2 further comprising:
receiving an indication of said at least one characteristic which is selected from the group consisting of: a vehicle type of one of said plurality of selected entities, an operation being performed by one of said plurality of selected entities, a speed of one of said plurality of selected entities, a weight of one of said plurality of selected entities, an estimated braking distance of one of said plurality of selected entities, a destination of one of said plurality of selected entities, a road upon which one of said plurality of selected entities is located, and a location of one of said plurality of selected entities.

5. The method as recited in claim 1 further comprising:
generating a collision alert message for causing said second of said plurality of selected entities to yield right of way to said first of said plurality of selected entities.

6. The method as recited in claim 5 further comprising:
receiving said collision alert message in a collision avoidance action implementer disposed within said second of said plurality of selected entities; and
implementing an action in response to receiving said collision alert message.

7. The method as recited in claim 6 wherein implementing said action comprises:
implementing an action selected from the group of actions consisting of: an operator notification, displaying a visual notification, and an intervention into the operation of said second of said plurality of selected entities.

8. The method as recited in claim 5 wherein causing said second of said plurality of selected entities further comprises:
generating a message for causing said second of said plurality of selected entities to come to a stop; and
generating a message for causing said second of said plurality of selected entities to reduce speed.

9. The method as recited in claim 1 further comprising:
generating a message to at least one of said first of said plurality of selected entities and said second of said plurality of selected entities indicating a maximum speed.

10. A system for automatically directing traffic on a site, said system comprising:

a collision avoidance action implementer disposed within a first entity on a site, said collision avoidance action implementer configured for wirelessly receiving an alert message to yield right of way to a second entity on said site and for visually displaying a warning to implement an action based upon receiving said alert message; and
a collision avoidance system configured to generate said message in response to determining that said second entity has right of way over said first entity based upon a first priority assigned to said first entity and a second priority assigned to said second entity, and wherein said first priority and said second priority are assigned based upon a cargo carried by said first entity and said second entity respectively.

11. The system of claim 10 wherein said collision avoidance system is configured to rank said first priority and said second priority.

12. The system of claim 11 wherein said ranking is based at least in part upon at least one characteristic which is selected from the group consisting of: a vehicle type of one of said first entity and said second entity, an operation being performed by one of said first entity and said second entity, a speed of one of said of said first entity and said second entity, a weight of one of said first entity and said second entity, an estimated braking distance of one of said first entity and said second entity, a destination of one of said first entity and said second entity, a road upon which one of said first entity and said second entity is located, and a location of one of said first entity and said second entity.

13. The system of claim 10 wherein said collision avoidance system is located independent from said first entity.

14. The system of claim 10 wherein said collision avoidance action implementer is further configured for receiving a second message from said collision avoidance system for causing said collision avoidance action implementer to display a maximum speed for operating said first entity.

15. The system of claim 10 wherein said collision avoidance action implementer displays a message for causing said first entity to come to a stop.

16. The system of claim 10 wherein said collision avoidance action implementer displays a message for causing said first entity to reduce its speed.

17. The system of claim 10 wherein said collision avoidance action implementer is further configured for generating an audible message.

18. The system of claim 10 wherein said collision avoidance action implementer is further configured for intervening into the operation of said first entity.

* * * * *